US012637886B2

(12) United States Patent
McClure et al.

(10) Patent No.: US 12,637,886 B2
(45) Date of Patent: May 26, 2026

(54) REMOVABLE CENTER GUIDE FOR SHOWER DOORS

(71) Applicant: Kohler Co., Kohler, WI (US)

(72) Inventors: Andrew McClure, Murray, KY (US); James Leland Marlowe, Troy, TN (US)

(73) Assignee: Kohler Co., Kohler, WI (US)

( * ) Notice: Subject to any disclaimer, the term of this patent is extended or adjusted under 35 U.S.C. 154(b) by 112 days.

(21) Appl. No.: 18/472,733

(22) Filed: Sep. 22, 2023

(65) Prior Publication Data

US 2024/0344377 A1 Oct. 17, 2024

Related U.S. Application Data

(60) Provisional application No. 63/496,139, filed on Apr. 14, 2023, provisional application No. 63/415,521, filed on Oct. 12, 2022.

(51) Int. Cl.
*E05D 15/06* (2006.01)

(52) U.S. Cl.
CPC ................................ *E05D 15/0656* (2013.01)

(58) Field of Classification Search
CPC ........... E05D 15/0656; E05Y 2900/114; E05Y 2201/684
See application file for complete search history.

(56) References Cited

U.S. PATENT DOCUMENTS

| | | | | | |
|---|---|---|---|---|---|
| 3,132,371 | A * | 5/1964 | Enos | E05D 15/0656 49/411 |
| 3,350,739 | A | 11/1967 | Rifkin | |
| 4,178,718 | A | 12/1979 | Laby | |
| 4,455,709 | A * | 6/1984 | Zanini | E05D 15/0656 49/411 |
| 5,031,271 | A * | 7/1991 | Baus | E05D 15/0656 49/159 |
| 5,675,936 | A * | 10/1997 | Kurth | E05D 15/0656 49/404 |
| 7,891,052 | B2 * | 2/2011 | Haab | E05F 5/003 16/98 |
| 9,382,737 | B2 * | 7/2016 | Wei | E05D 15/0656 |
| 9,974,415 | B2 * | 5/2018 | Ball | A47K 3/34 |
| 10,036,190 | B2 * | 7/2018 | Minkovich | E06B 3/4681 |
| 10,610,060 | B2 | 4/2020 | Ball et al. | |
| 11,039,717 | B2 * | 6/2021 | Romero | E05D 15/0656 |
| 11,466,495 | B2 | 10/2022 | Veilleux et al. | |

(Continued)

FOREIGN PATENT DOCUMENTS

| | | | | |
|---|---|---|---|---|
| CN | 105421924 A * | 3/2016 | E05D 13/00 |
| CN | 107223177 B | 9/2017 | |

(Continued)

*Primary Examiner* — Jason W San
*Assistant Examiner* — Matthew J Sullivan
(74) *Attorney, Agent, or Firm* — Foley & Lardner LLP

(57) ABSTRACT

A removable center guide for shower doors includes a center guide, and a mount. The center guide is releasably coupled to the mount. The center guide includes a button, a center plate, and a latch coupled to the center plate. The mount includes a recess configured to receive the latch, thus coupling the center guide to the mount. When the button is pressed, the button forces the center plate to move along a horizontal plane disengaging the latch from the recess releasing the center guide from the mount.

20 Claims, 28 Drawing Sheets

(56) References Cited

U.S. PATENT DOCUMENTS

| | | | | |
|---|---|---|---|---|
| 11,655,658 | B2 | 5/2023 | Simek | |
| 2013/0256331 | A1 * | 10/2013 | Giraud | A61J 1/03 221/277 |
| 2018/0291662 | A1 | 10/2018 | Hilliaho | |
| 2023/0003064 | A1 | 1/2023 | Veilleux et al. | |
| 2023/0180969 | A1 | 6/2023 | Simek et al. | |
| 2024/0344377 | A1 * | 10/2024 | McClure | E05D 15/0656 |

FOREIGN PATENT DOCUMENTS

| | | | | | |
|---|---|---|---|---|---|
| CN | 207633953 | U | | 7/2018 | |
| CN | 108625707 | A | * | 10/2018 | E05D 15/066 |
| CN | 107995935 | B | | 5/2020 | |
| CN | 211776725 | U | | 10/2020 | |
| DE | 20 2006 005 607 | U1 | | 6/2006 | |
| DE | 102004059969 | A1 | * | 6/2006 | E05D 15/0656 |
| DE | 202007003367 | U1 | * | 5/2007 | E05D 15/0621 |
| DE | 202012004752 | U1 | * | 8/2013 | E05D 15/0656 |
| DE | 102016117739 | A1 | * | 3/2018 | E05D 15/0656 |
| EP | 0524091 | A1 | * | 1/1993 | E05D 15/066 |
| EP | 1394347 | A1 | * | 3/2004 | E05D 15/0656 |
| EP | 2 727 506 | B1 | | 5/2014 | |
| EP | 2009208 | B1 | * | 10/2014 | E05D 15/0656 |
| EP | 3095365 | A1 | * | 11/2016 | E05D 15/0656 |
| EP | 3222803 | B1 | * | 3/2018 | E05D 15/0656 |
| EP | 3296496 | A1 | * | 3/2018 | E05D 15/063 |
| EP | 3477029 | A1 | * | 5/2019 | E05D 15/0691 |
| EP | 3508680 | A1 | * | 7/2019 | E05D 15/12 |
| EP | 3 095 365 | B1 | | 10/2019 | |
| GB | 1394225 | A | * | 5/1975 | E05D 15/0656 |
| WO | WO-2019084957 | A1 | * | 5/2019 | E05D 13/00 |

* cited by examiner

REMOVABLE CENTER GUIDE FOR SHOWER DOORS

CROSS-REFERENCE TO RELATED APPLICATIONS

This application claims the benefit of and priority to U.S. Provisional Patent Application No. 63/415,521, filed Oct. 12, 2022, and U.S. Provisional Patent Application No. 63/496,139, filed Apr. 14, 2023, which are both hereby incorporated by reference in their entirety.

BACKGROUND

The present disclosure relates generally to a removable center guide for shower doors.

Sliding showers doors are commonly used in home bath configurations. Sliding doors are desirable because they allow easy access to shower areas. Furthermore, shower doors are often translucent making them desirable for obtaining a brighter, naturally lit shower area. However, the alignment of the shower doors is critical for proper movement of the shower doors along a track. The shower doors are hung within the track and at least one of the shower doors slides within the track. One shower door may slide laterally within the track relative to the second shower door so that the user can enter and exit the shower. For example, if the shower doors are not properly aligned and secured within the track, the one or more sliding shower doors may swing within the track or get stuck such that it is difficult to open them. For example this may damage the doors or the track. As another example, water may sit stagnant within the shower door track causing mold to form. This may also cause various parts, such as the center guide, to crack or break. The user may be tasked with replacing various parts within the shower door system. Furthermore, stagnant moisture and debris may build up within the center guide. For example, moisture and debris such as soap may cause discoloration or mold to occur on the center guide or components within the center guide. Therefore, the user may desire to clean the center guide and components. Aspects of the center guide system may be difficult to clean without replacing. For example, moisture and debris may build up between the center guide and the component that secures the center guide to the shower system.

It would be advantageous to provide a removable center guide for shower doors to provide an improved device that addresses one or more of the aforementioned issues.

SUMMARY

One embodiment of the present disclosure relates to a removable center guide system including a mount, a center guide, a release component, and a spring biased plunger. The mount is configured to engage a shower rail. The center guide is releasably coupled to the mount and has one or more openings configured to receive a bottom edge of at least one shower door. The release component is horizontally movable within the center guide. The release component includes an end with a first angled face. The spring biased plunger is vertically movable within the center guide. The spring biased plunger includes a second angled face. The second angled face is slidably engageable with the first angled face. Some embodiments further include a first spring-biased stopper and a second spring biased stopper coupled to the mount and coupled to the release component. The first spring-biased stopper and the second spring-biased stopper are compressed when the release component is moved horizontally towards the mount. The first spring-biased stopper and the second spring-biased stopper are configured to move the release component horizontally within the center guide back to a resting position.

DETAILED DESCRIPTION

Figure 1:
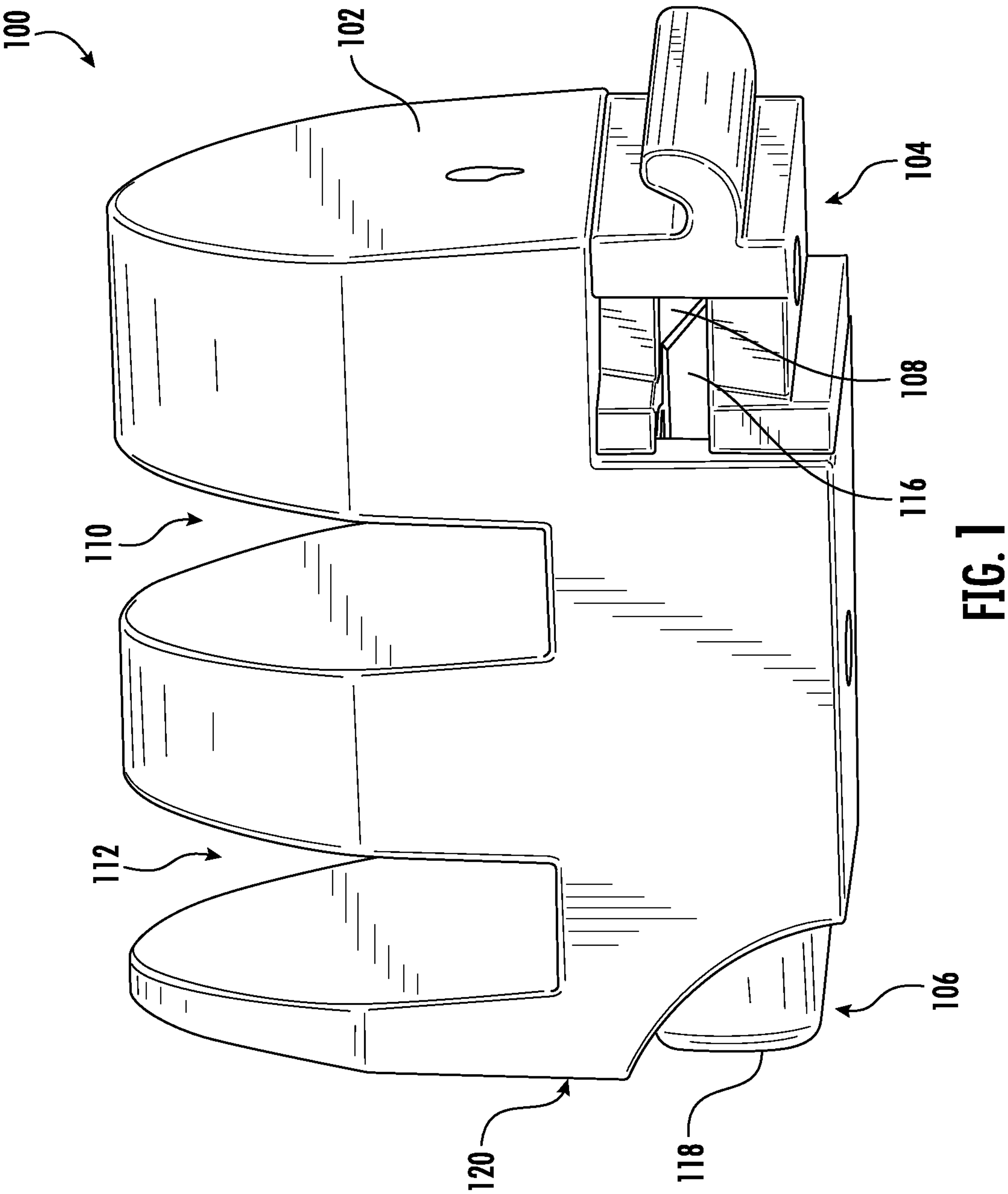
FIG. 1 is a perspective view of a removable center guide system according to one embodiment.

A removable center guide provides a hassle-free solution to remove the center guide from the system for cleaning of the center guide and components of the center guide system when moisture and debris build up within the system causing mold, discoloration, and other undesirable affects.

Referring generally to the FIGURES, disclosed herein is a removable center guide system 100 for shower doors shown according to one embodiment that generally includes a center guide 102 and a mount 104. The center guide 102 further includes a release component 106, and a plunger 108. The removable center guide is retrofittable for use with various different shower doors (e.g., bypass doors, sliding doors, etc.) and railing systems (e.g., aluminum rails, etc.). The center guide 102 is selectively coupled to the mount 104. The center guide 102 houses the release component 106 and the plunger 108. The mount 104 can be coupled to various existing rails. The center guide 102 can be selectively coupled to the mount 104. The release component 106 is configured to move along a horizontal plane. The release component 106 can be pressed inward to engage with the plunger 108. The plunger 108 is configured to provide a downward force onto the mount 104 and move along a vertical plane. When pressed inward, the release component 106 engages the plunger 108 such that the plunger moves upward and release the downward force on the mount 104. The center guide 102, including the release component 106 and the plunger 108, can slide along the stationary rail to uncouple the center guide 102 from the mount 104. Furthermore, the center guide 102 can be removed from the shower doors and railing system and replaced with a new center guide.

Referring more particularly to FIGS. 1-6, an exemplary embodiment of the removable center guide system 100 is shown. As shown in FIG. 1 the removable center guide system 100 includes a center guide 102 and a mount 104. The center guide 102 further includes a release component 106 and a plunger 108. The release component 106 includes a pin 116 and a button 118. The button 118 is positioned outside of the center guide 102. The center guide 102 includes an arched cutout 120 that further exposes the button 118. The release component 106 is configured to move along a horizontal plane towards the mount 104 when pressure is applied to the button 118. The pin 116 is configured to engage the plunger 108. When pressure is applied to the button 118 and the release component 106 has moved a horizontal distance towards the mount 104, the tapered face of the pin 116 moves the plunger 108 upward along a vertical plane defined within the center guide 102. The center guide 102 further includes a first aperture 110 (e.g., an opening, a lot, etc.) and a second aperture 112. The first aperture 110 and the second aperture 112 are configured to receive a first door and a second door respectively. The mount 104 further includes a hook 114. The hook 114 is configured to secure the mount to an existing rail (e.g., of a shower door frame).

Figure 2:
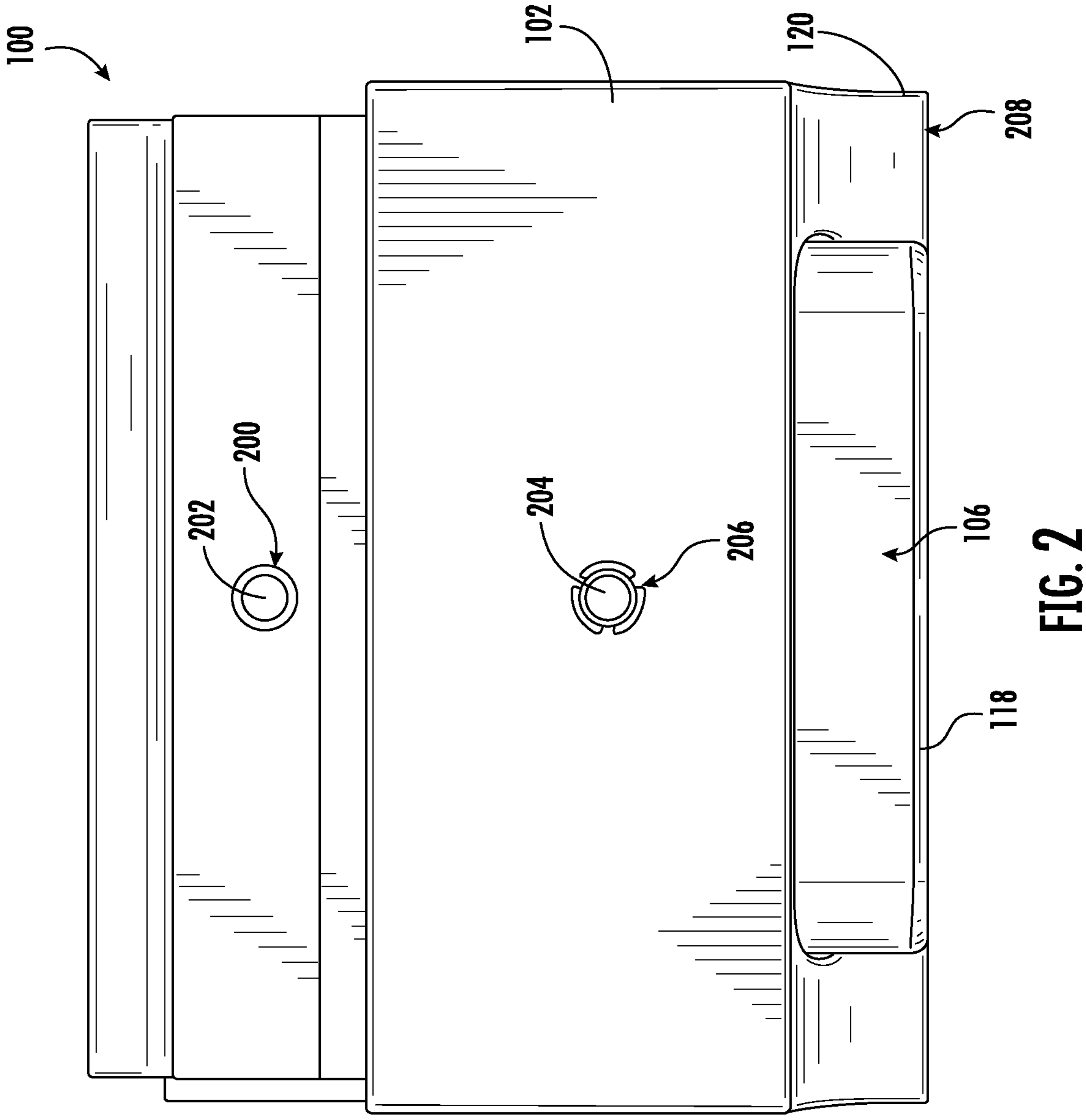
FIG. 2 is a perspective bottom view of a removable center guide system according to the embodiment of FIG. 1.

FIG. 2 is a bottom view of the exemplary embodiment of FIG. 1. As shown in this embodiment, the button 118 of the release component 106 is positioned such that the button 118 and an edge of the center guide 208 are flush. The center guide 102 further includes an opening 206. The opening 206 is configured to receive a first vertical dowel 204. The first vertical dowel 204 extends upward into the center guide and through the release component 106. The first vertical dowel 204 is configured to secure the release component to the center guide. For example, the first vertical dowel 204 allows the release component 106 to move a distance along the horizontal plane toward the mount 104 as defined by the center guide 102. The first vertical dowel 204 can also prevent the release component 106 from moving outward past the edge of the center guide 208. For example, the first vertical dowel 204 prevents the uncoupling of the release component 106 from the center guide 102. The mount 104 further includes a circular opening 200. The circular opening 200 is configured to receive a screw 202. The screw 202 is configured to couple the mount 104 to an existing rail. For example, the center guide 102 may be removed from the rail while the mount 104 remains stationary and coupled to the rail.

Figure 3:
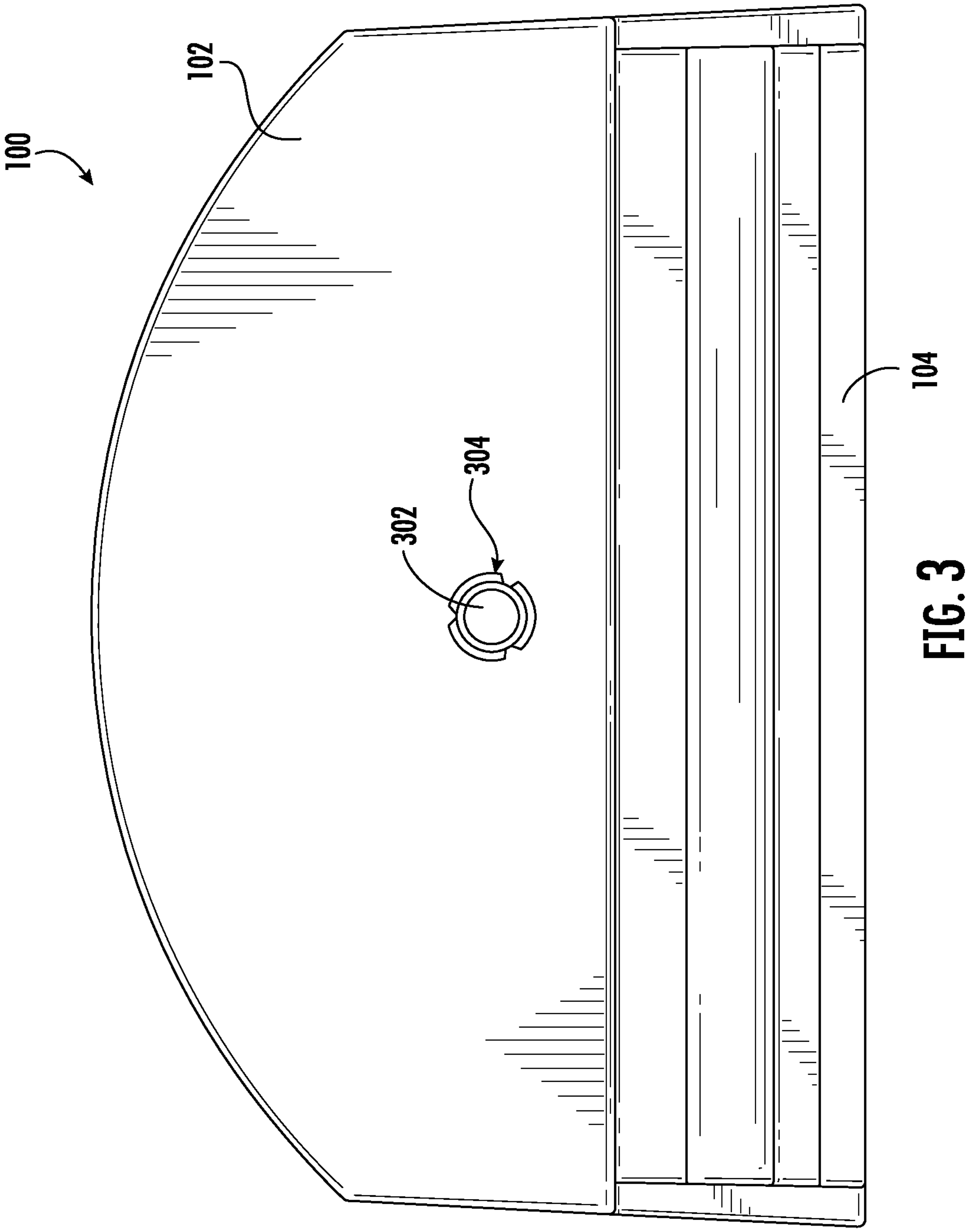
FIG. 3 is a perspective side view of a removable center guide system according to the embodiment of FIG. 1

FIG. 3 is a side view of the center guide 102 and the mount 104 of the removable center guide system 100 according to the exemplary embodiment of FIG. 1. The center guide 102 further includes a circular opening 304. The circular opening 304 is configured to receive a horizontal dowel 302. The horizontal dowel 302 is configured to secure the plunger 108 (not shown in FIG. 3) within the center guide 102. For example, the plunger 108 can move vertically along a defined vertical plane within the center guide 102. The horizontal dowel 302 prevents the uncoupling of the plunger 108 from the center guide 102.

Figure 4:
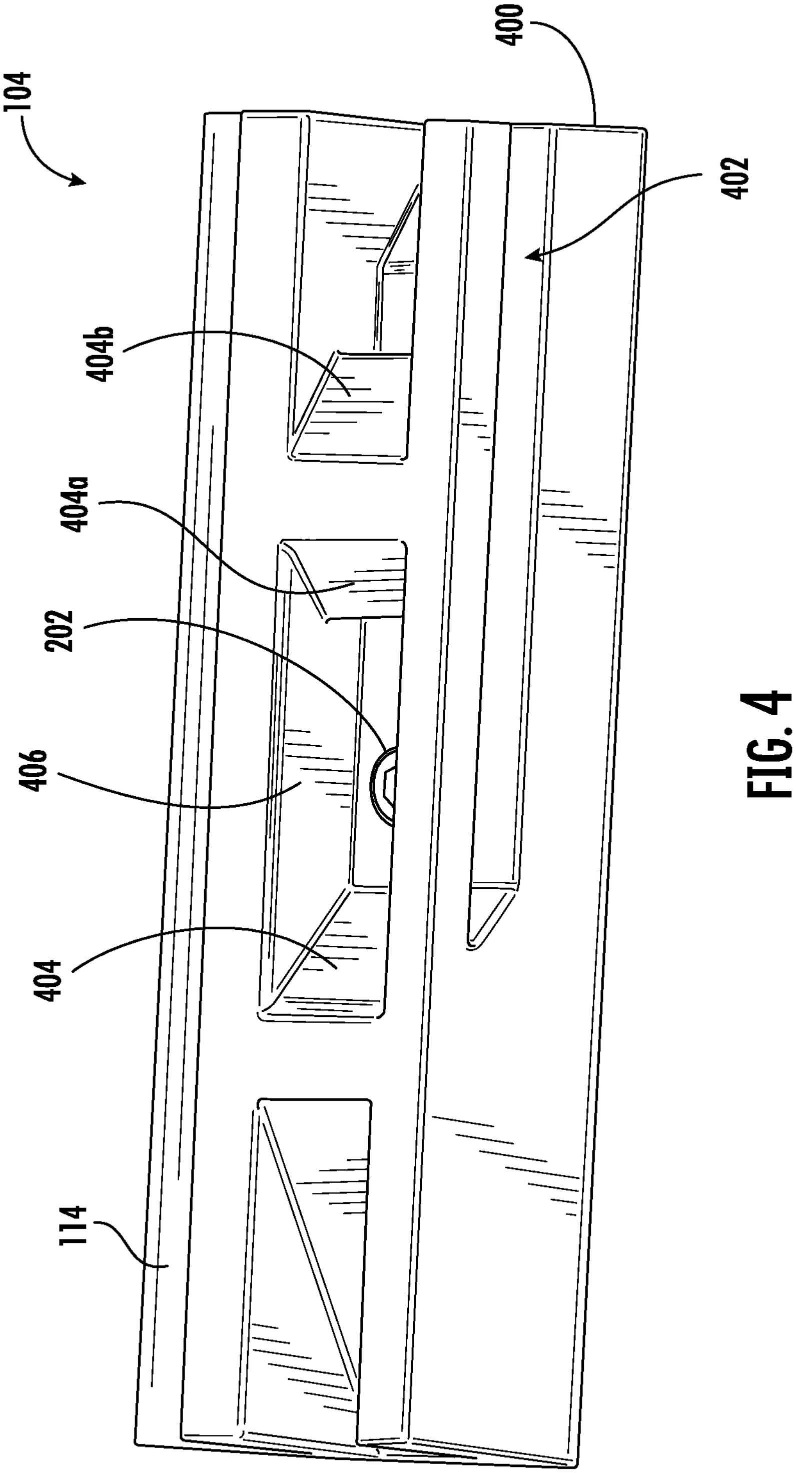
FIG. 4 is a perspective view of a mount for the removable center guide system according to the embodiment of FIG. 1

FIG. 4 is a perspective view of the mount 104 according to the exemplary embodiment of FIG. 1. The mount 104 further includes a slot 402 and a plurality of ramps 404. The slot 402 may extend from the edge 400 to near the center of the mount 104. The slot 402 is configured to receive the pin 116 of the release component 106. For example, the pin 116 may move (e.g., slide) horizontally within the slot 402. The plurality of ramps 404 define a mount aperture 406. The mount aperture 406 is configured to receive the plunger 108 (not shown in FIG. 4) and secure (e.g., couple, lock, etc.) the center guide 102 (not shown in FIG. 4) to the mount 104. The plurality of ramps 404 are configured to guide the plunger 108 in and out of the mount aperture 406. For example, when pressure is applied to the button 118 and the pin 116 is wedged between the plunger 108 and the mount aperture 406, the center guide 102 can be moved horizontally away from the mount 104, thus uncoupling the center guide 102 from the mount 104. The plunger 108 is guided up a first ramp 404*a* and down a second ramp 404*b* and uncoupled from the mount 104.

Figure 5:
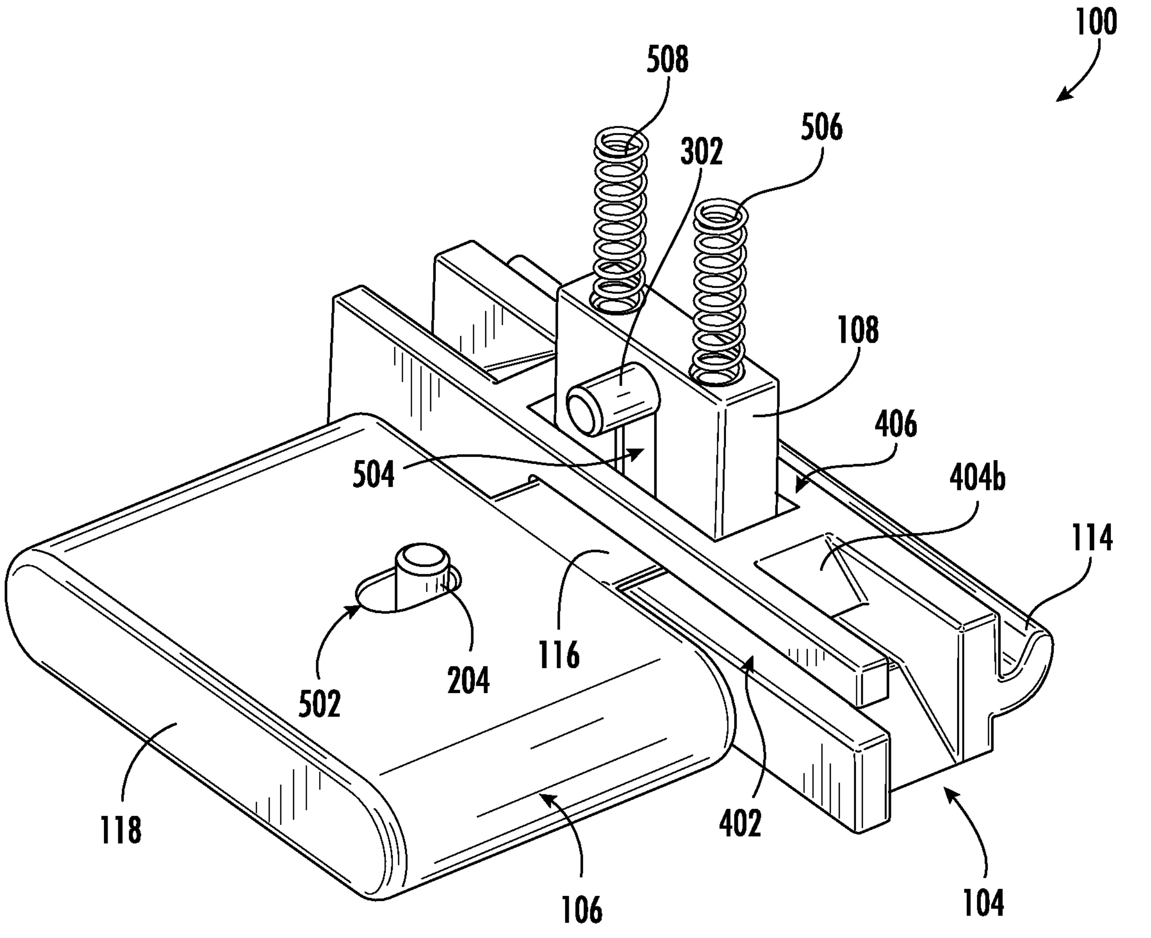
FIG. 5 is a perspective view of the interior components of a removable center guide system according to the embodiment of FIG. 1.

FIG. 5 is a perspective view of the interior components of a removable center guide system according to the embodiment of FIG. 1. As shown in this embodiment, the release component 106 includes a first oval opening 502 (e.g., slot, etc.). The oval opening is configured to receive the first vertical dowel 204 as previously described. For example, the first oval opening 502 allows the release component 106 to move horizontally a defined distance within the center guide 102 (not shown in FIG. 5). The plunger 108 includes a second oval opening 504. The second oval opening 504 is configured to receive the horizontal dowel 302 as previously described. The second oval opening 504 allows the plunger 108 to move vertically a defined distance within the center guide 102. The plunger 108 is also coupled to a first vertical spring 506 and a second vertical spring 508. The first vertical spring 506 and the second vertical spring 508 are also coupled to the inside of the center guide 102. The first vertical spring 506 and the second vertical spring 508 are configured to provide a downward force to the plunger 108. For example, the downward force provided to the plunger 108 may prevent the plunger 108 from moving within the mount aperture 406. Furthermore, for example, when force is applied to the button 118 and the pin 116 wedges (e.g., engages) between the plunger 108 and the bottom of the mount aperture 406, the first vertical spring 506 and the second vertical spring 508 are compressed. The first vertical spring 506 and the second vertical spring may be progressively compressed as the plunger 108 moves up the first ramp 404*a* and progressively released as the plunger 108 moves down the second ramp 404*b*.

Figure 6:
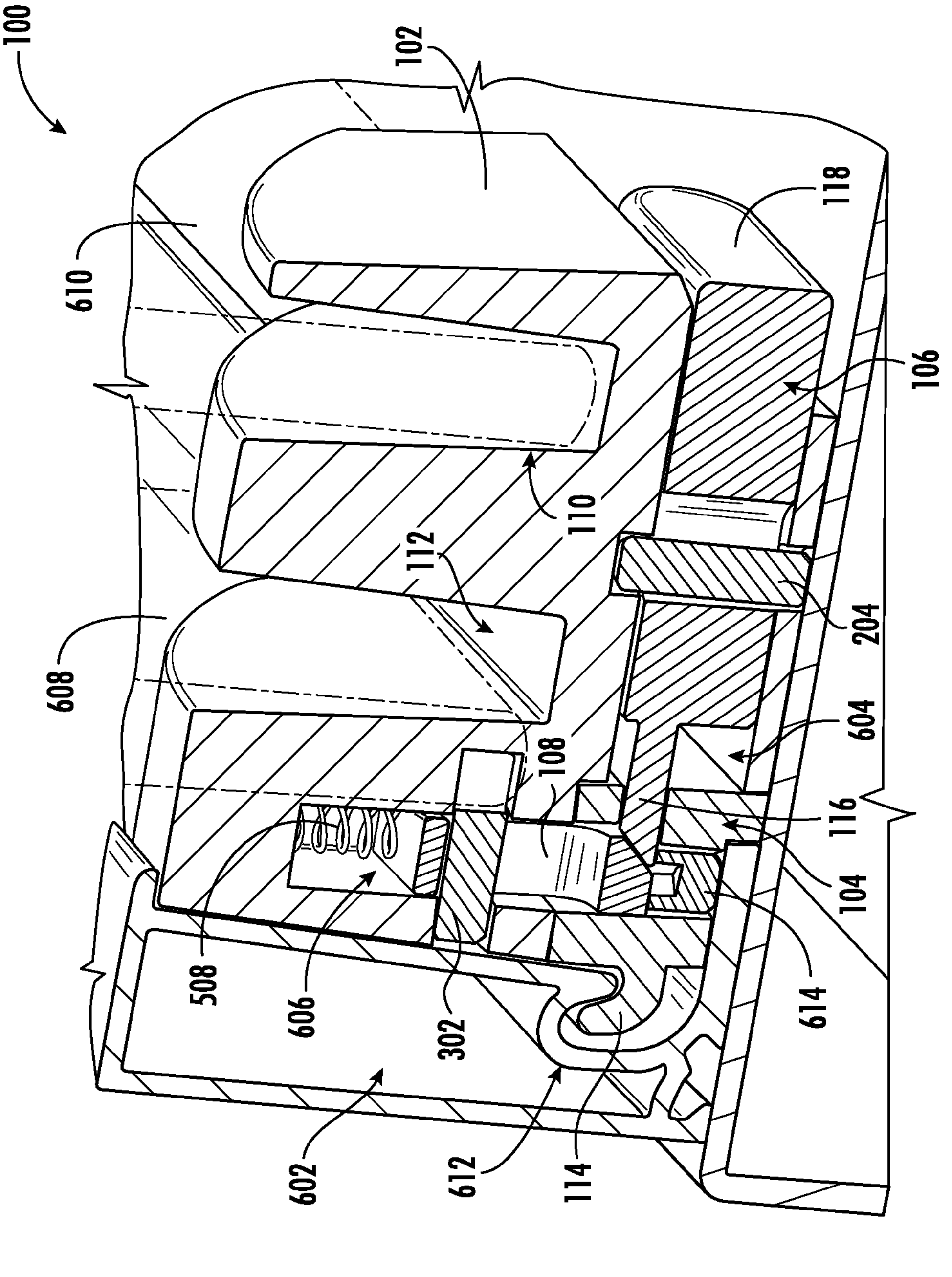
FIG. 6 is a cutaway view of a removable center guide system shown deployed in a shower guide track according to one embodiment.

FIG. 6 is a cutaway view of a removable center guide system 100 shown deployed in a shower guide rail 602 and coupled to a first shower door 608 and a second shower door 610 according to one embodiment. As shown in this embodiment, the center guide 102 further includes a release component cavity 604 and a plunger cavity 606. The release component 106 is positioned within the release component cavity 604. For example, the release component cavity 604 defines the horizontal distance the release component may move within the center guide 102. The plunger 108 is positioned within the plunger cavity 606. For example, the plunger cavity 606 defines the vertical distance the plunger 108 may move within the center guide 102.

Now referring to the system as shown in FIGS. 4-6, specifically as shown in FIG. 6, the removable center guide system 100 is coupled to a shower guide rail 602. For example, to assemble the removable center guide system 100, the mount 104 is first coupled to the shower guide rail 602. The hook 114 is inserted underneath the crevice 612 of the shower guide rail 602. For example, the hook 114 may be titled at angle and inserted underneath the crevice 612 such that the hook 114 latches onto the crevice 612. The screw 614 is then placed through the mount 104 and into the bottom surface of the shower guide rail 602. The screw 614 is configured to couple the mount 104 to the shower guide rail 602. For example, the screw 614 is tightened such that the mount 104 cannot move translationally or rotationally relative to the shower guide rail 602.

According to the embodiment of FIG. 6, once the mount 104 is secured to the shower guide rail 602, the center guide 102 is coupled to the mount 104. For example, the first shower door 608 and the second shower door 610 are first coupled to the center guide 102. For example, the first shower door 608 and the second shower door 610 may be hung from a top rail (not shown), such that the first shower door 608 and the second shower door 610 can freely swing about the top rail. The center guide 102 may then be slid onto the bottom of the first shower door 608 and the bottom of the second shower door 610 such that the center guide 102 alights the bottom of the first shower door 608 and the bottom of the second shower door 620 with the shower guide rail 602.

Furthermore, the center guide 102 prevents the first shower door 608 and the second shower door 610 from swinging. The center guide 102 may then be coupled to the mount 104 that may already be coupled to the shower guide rail 602. For example, the center guide 102 may horizontally slide into the mount 104. For example, as the center guide 102 slides into the mount 104, the plunger 108 moves up the second ramp 404*b* (as previously described) and down the first ramp 404*a* (also previously described and shown in FIG. 5) into the mount aperture 406 as previously shown in FIG. 4. As the plunger 108 moves a vertical distance up the second ramp 404*b* of the mount 104, the spring 508 is compressed. When the plunger 108 moves down the first ramp 404*a*, the plunger 108 moves downward a vertical distance and the spring 508 is released. For example, after the plunger 108 moves a vertical distance down the first ramp 404*a*, the plunger 108 is stationary within the mount aperture 406 due to the downward force of the spring 508.

To remove the center guide 102 from the mount 104, the release component 106 engages with the plunger 108. For example, the user can push the button 118 inward towards the mount 104. When the release component 106 is pushed inward, the pin 116 wedges (e.g., engages) between the plunger 108 and the bottom of the mount aperture 406 causing the spring 508 to compress. The user can then slide the center guide 102 horizontally across the mount 104 during which the plunger 108 can move a vertical distance up the first ramp 404*a* and then down the second ramp 404*b* releasing the spring 508. Other embodiments of the removable center guide system 100 may operate in a similar manner.

Figure 7:
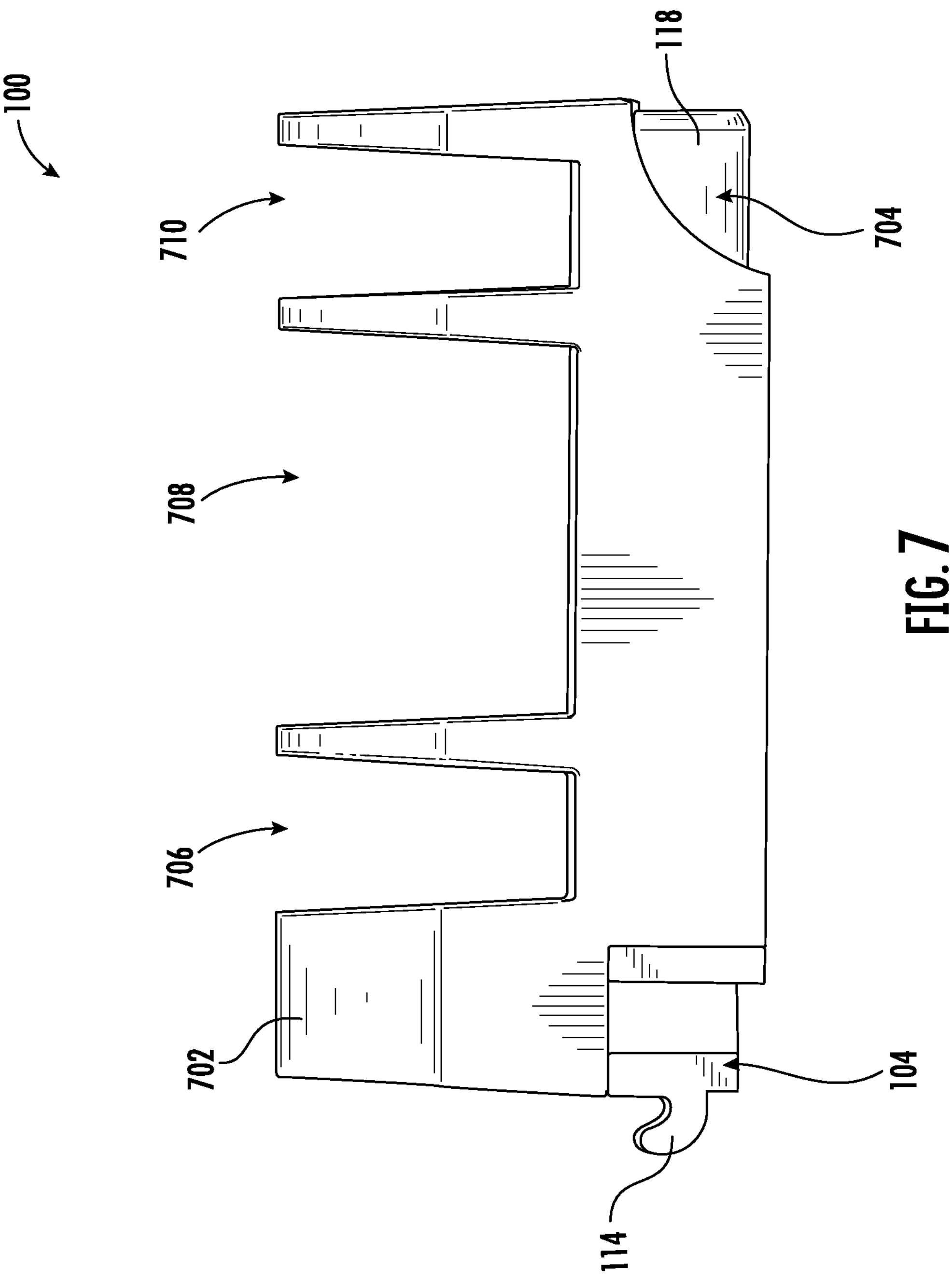
FIG. 7 is a perspective front view of a removable center guide system according to another exemplary embodiment.
Figures 8A, 8B, 8C:
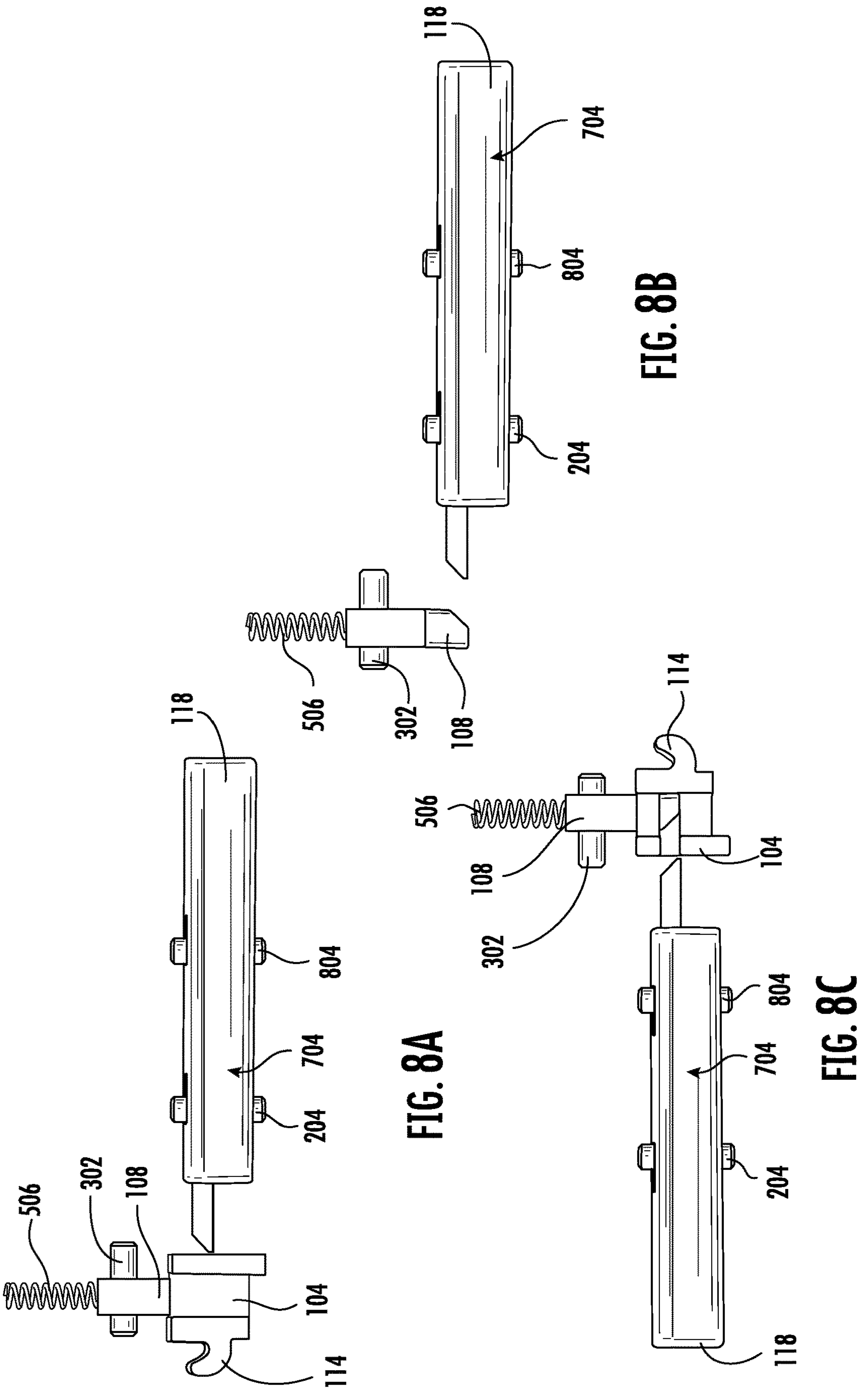
FIGS. 8A-8C are perspective side views of the interior components of a removable center guide system according to the exemplary embodiment of FIG. 7.

Now referring to FIGS. 7-8, another exemplary embodiment of the removable center guide system 100. FIG. 7 is a perspective view of a removable center guide system 100 according to another exemplary embodiment. This embodiment includes the center guide 702, an elongated release component 704, and the mount 104. The center guide 702 includes a first aperture 706, a second aperture 708, and a third aperture 710. According to this embodiment, the first aperture 706 and the third aperture 710 are substantially equivalent dimensions (e.g., height and width). The first aperture 706 and the third aperture 710 are configured to receive a first shower door and a second shower door (not shown) respectively. The second aperture 708 may have a larger width than the first aperture 706 and the third aperture 710. The second aperture 708 may be configured to allow multiple shower doors to pass simultaneously through the center guide 702. For example, the center guide 702 including the second aperture 708 may be used with a bypass shower door system. FIGS. 8A-8C are perspective side views of the interior components of the removable center guide system 100. The elongated release component 704 is elongated to match the width of the center guide 102 as shown in FIG. 7. The elongated release component 704 includes the first vertical dowel 204 and a second vertical dowel 804. The first vertical dowel 204 and the second vertical dowel 804 are configured to allow the elongated release component 704 to move within the center guide 702.

Figure 9:
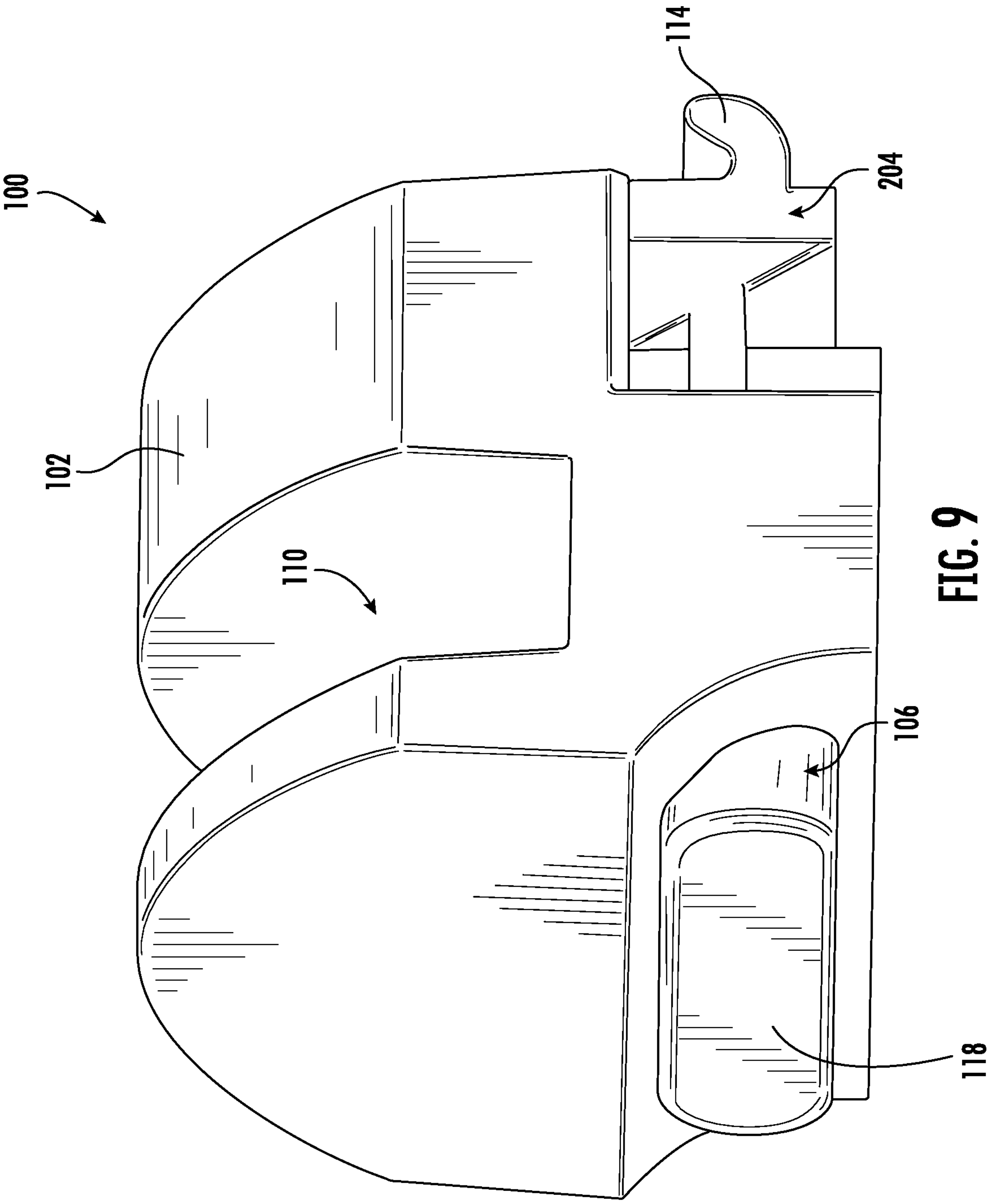
FIG. 9 is a perspective view of a removable center guide system according to another exemplary embodiment.
Figure 10:
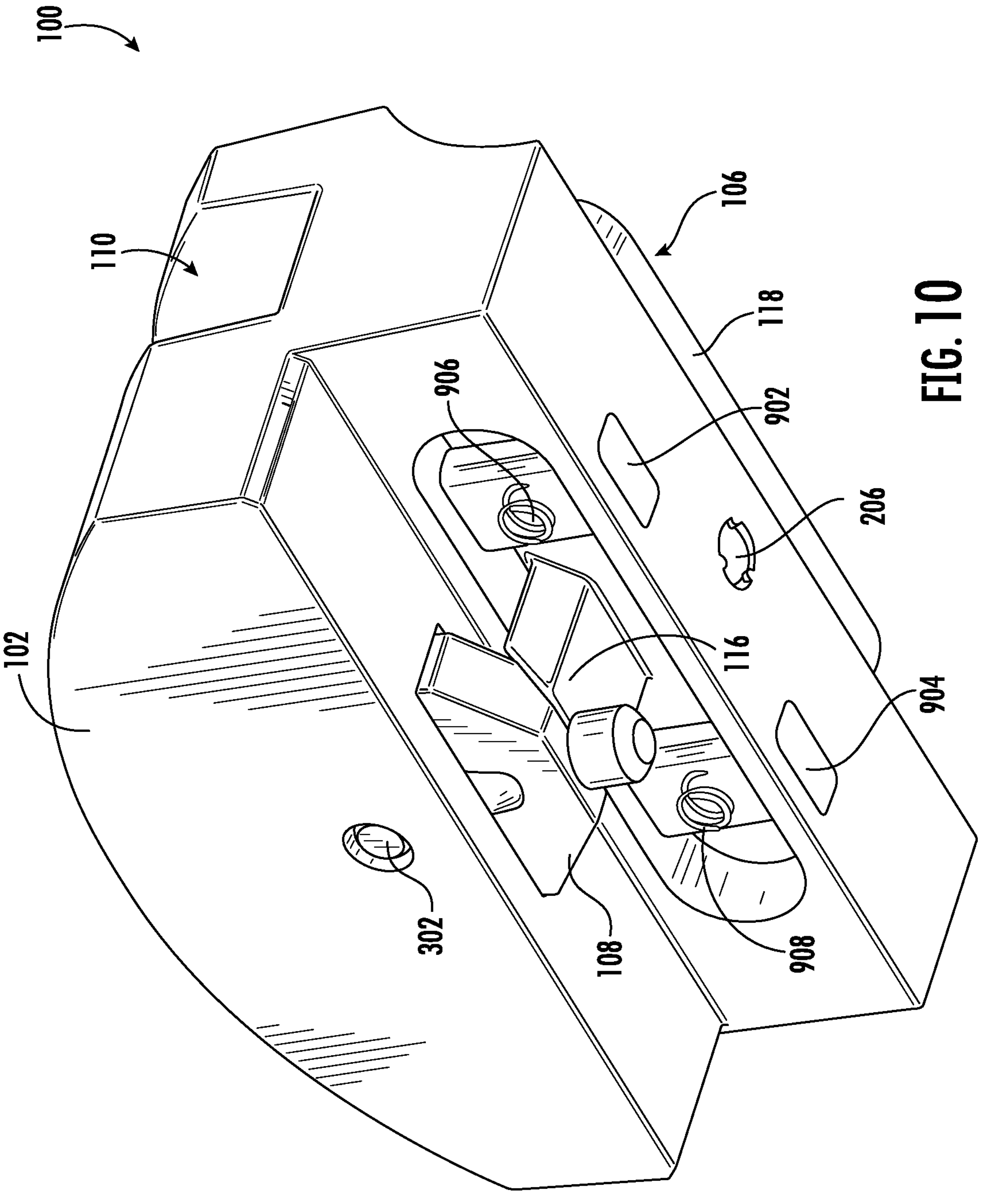
FIG. 10 is a perspective view of a portion of a removable center guide system according to the exemplary embodiment of FIG. 9.
Figure 11:
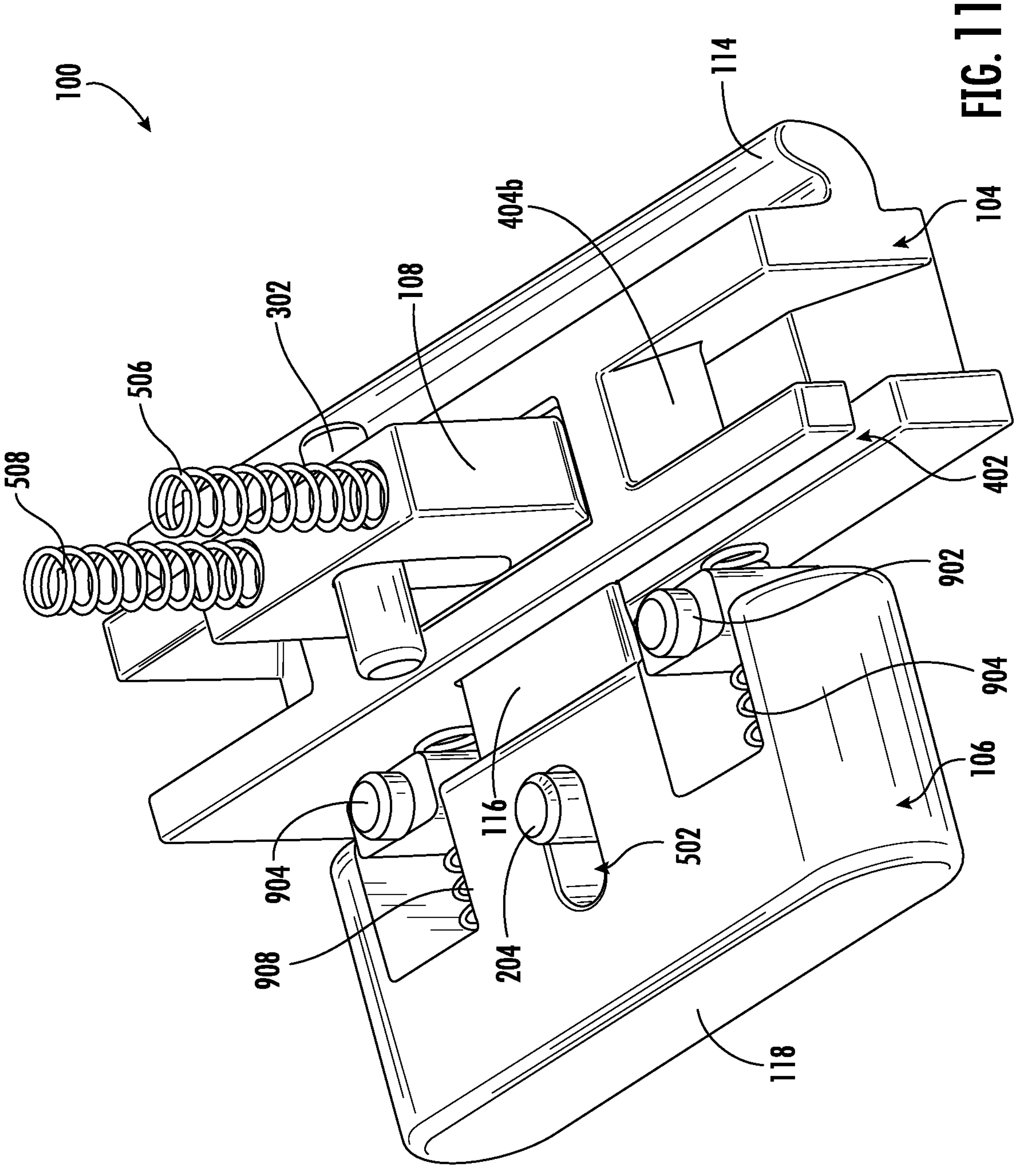
FIG. 11 is a perspective top down view of the interior components of a removable center guide system according to the exemplary embodiment of FIG. 9.
Figures 12A, 12B, 12C, 12D:
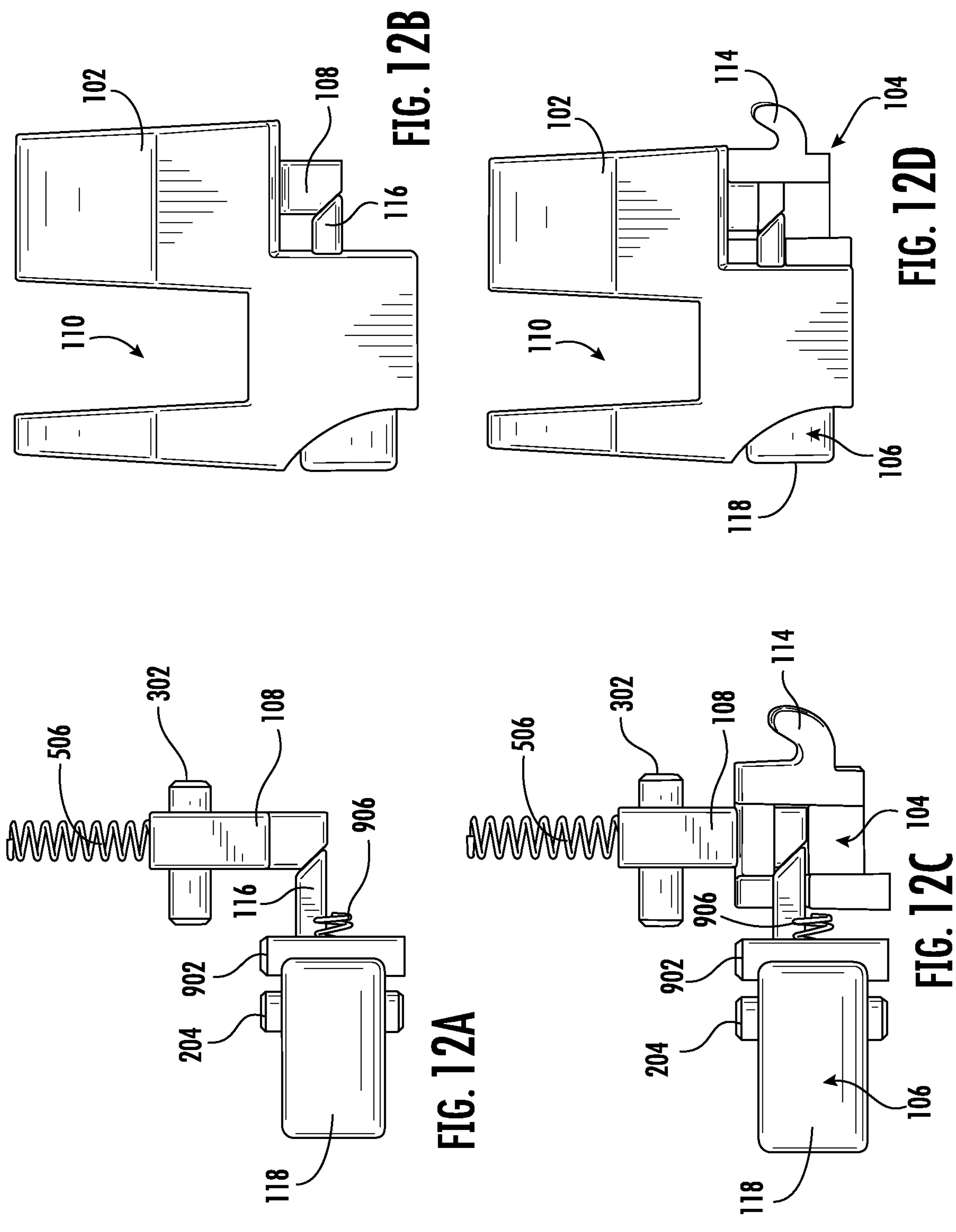
FIGS. 12A-12D are side views of a removable center guide system according to the exemplary embodiment of FIG. 9.

Now referring to FIGS. 9-12 is yet another exemplary embodiment of the removable center guide system 100. FIG. 9 is a perspective view of the removable center guide system for shower doors 100 including a center guide 102, the mount 104, and the release component 106. The center guide 102 includes the first aperture 110. The first aperture 110 is configured to receive a shower door (not shown). For example, the center guide 102 according to this embodiment may be used with a slider shower door system (e.g., a slider door and a fixed panel system). FIG. 10 depicts a bottom view of the center guide 102 and the release component 106. The removable center guide system 100 further includes a first stopper 902, a second stopper 904, a first horizontal spring 906, and a second horizontal spring 908. The first stopper 902 and the second stopper 904 are coupled to the first horizontal spring 906 and the second horizontal spring 908 respectively. The first stopper 902 and the second stopper 904 are also coupled (e.g., press fit) to the center guide 102. The first horizontal spring 906 and the second horizontal spring 908 are also coupled to the mount 104 and the release component 106. The first stopper 902 and the second stopper 904 along with the first horizontal spring 906 and the second horizontal spring 908 are configured to force the release component 106 back to a resting position. For example, if the button 118 is pressed inward towards the mount 104 compressing the first horizontal spring 906 and the second horizontal spring 908, the plunger 108 may be released from the mount aperture 406 such that the center guide 102 may be uncoupled from the mount 104. Once the button 118 is released, the first horizontal spring 906 and the second horizontal spring 908 are also released, forcing the release component back into the resting position flush with the center guide 102. FIGS. 11-12 are side views of the removable center guide system 100 according to the embodiment of FIGS. 9-10. As shown in FIGS. 11-12, the first stopper 902, the second stopper 904, the first horizontal spring 906, and the second horizontal spring 908 are positioned within the center guide 102.

Figure 13:
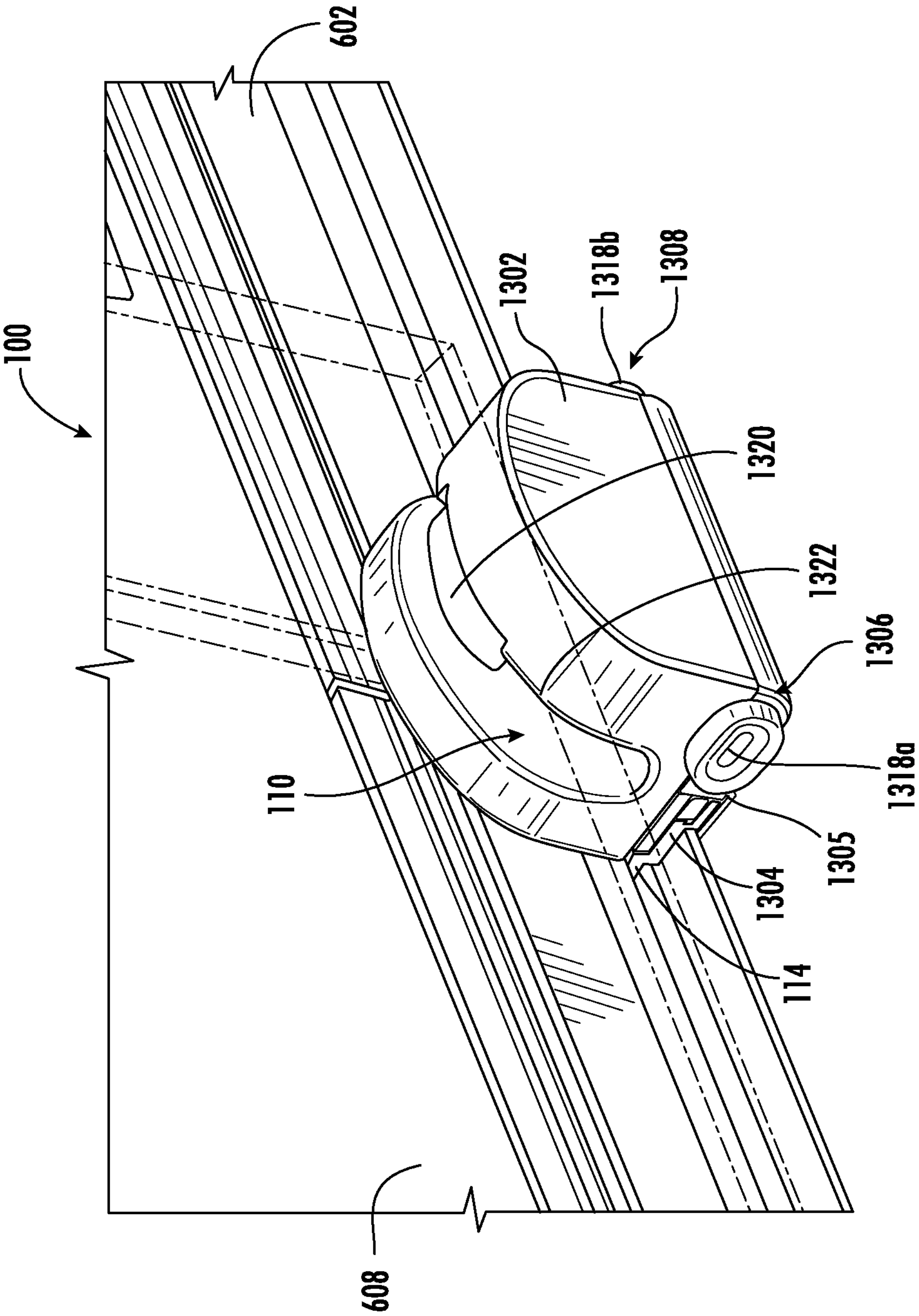
FIG. 13 is a perspective view of a removable center guide system according to another embodiment.
Figure 14:
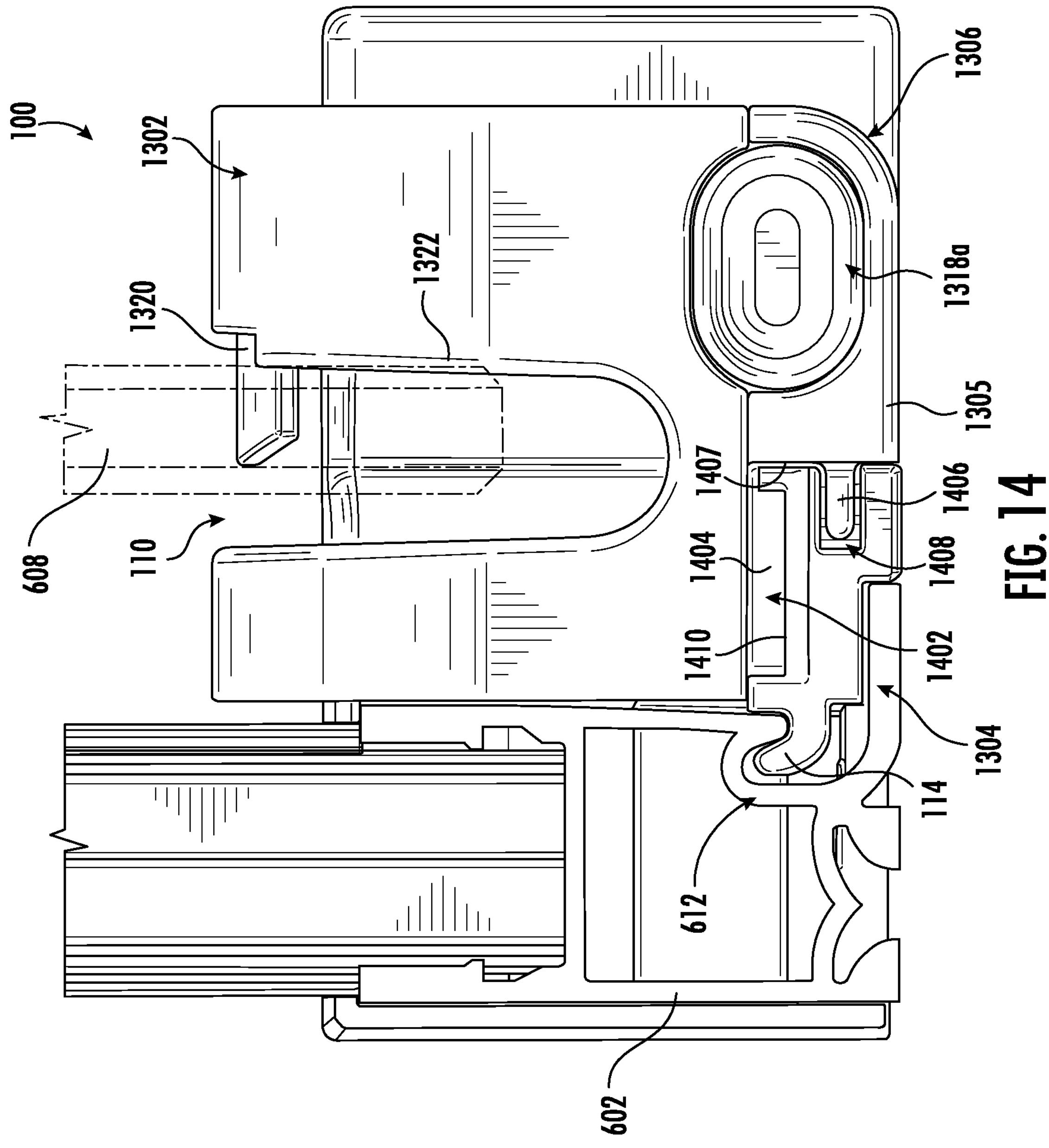
FIG. 14 is a side view of the removable center guide system according to the exemplary embodiment of FIG. 13.
Figure 15:
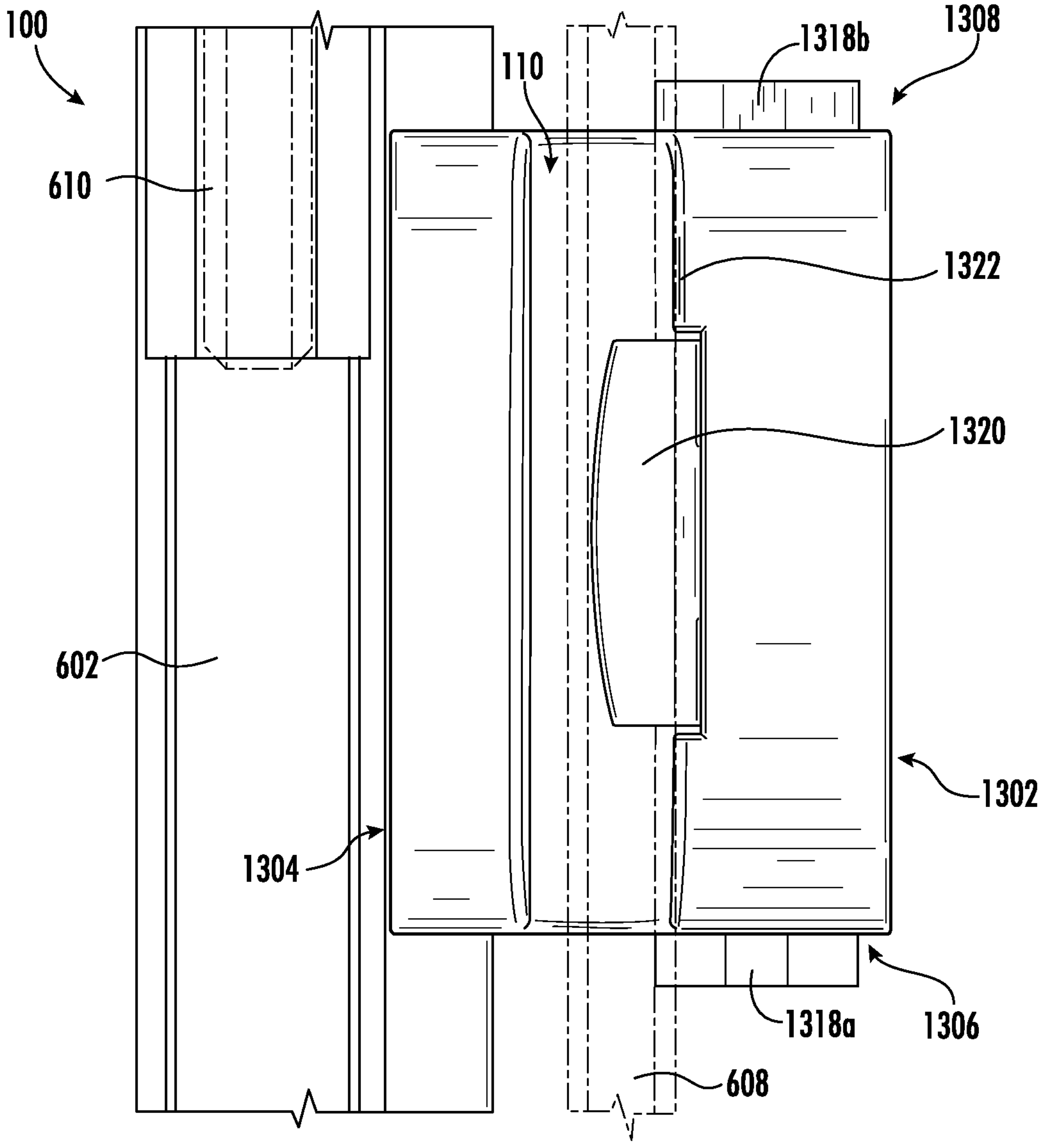
FIG. 15 is a top down view of the removable center guide system according to the exemplary embodiment of FIG. 13.

FIGS. 13-15 illustrate another exemplary embodiment of the removable center guide system 100. FIG. 13 is a prospective view of the removable center guide system 100. FIG. 14 is a side view of the removable center guide system 100 of FIG. 13. FIG. 15 is a top view of the removable center guide system 100 of FIG. 13. As shown in FIGS. 13-15, the removable center guide system 100 includes a center guide 1302 and a mount 1304.

The center guide 1302 includes the first aperture 110. The first aperture 110 receives the first shower door 608. For example, the center guide 102 according to this embodiment may be used with a slider shower door system (e.g., a slider door and a fixed panel system).

The mount 1304 is coupled to the center guide 1302. For example, the mount 1304 may be coupled to a bottom end 1305 of the center guide 1302. To couple the mount 1304 to the removable center guide 1302, the user may slide the mount 1304 onto the mount onto the bottom end 1305 of the center guide 1302. The mount 1304 is configured to secure the center guide 1302 to the shower guide rail 602. For example, the center guide 1302 may be removed from the guide rail 602 while the mount 1304 remains coupled to the shower guide rail 602. The mount 1304 further includes the hook 114. The hook 114 is positioned underneath the crevice 612 of the shower guide rail 602. The hook 114 may be slid underneath the crevice 612 and then the mount 1304 may be secured to the shower guide rail 602 by a screw 202 to prevent the hook 114 from sliding along the crevice 612.

The center guide 1302 also includes at least one button 1318. The at least one button 1318 may be positioned on a first end 1306 of the center guide 1302. The first button 1318*a* is positioned opposite the second button 1318*b*. For example, the center guide 1302 may include a first button 1318*a* and a second button 1318*b*. The first button 1318*a* may be positioned a first end 1306 of the center guide 1302 and the second button 1318*b* may be positioned on a second end 1308 of the center guide 1302. The first button 1318*a* and the second button 1318*b* are configured to release the center guide 1302 from the mount 1304.

The center guide 1302 further includes a first wing 1320, and a first aperture wall 1322. The first aperture wall is positioned defines the first aperture 110 of the center guide 1302. The first wing 1320 extends horizontally outward into the first aperture 110. For example, the first wing 1320 may extend outward from the center guide 1302 at an angle substantially perpendicular to the first aperture wall 1322 of the center guide 1302. The first wing 1320 is configured to secure the center guide 1302 to the first shower door 608. For example, the first wing 1320 may apply pressure to the first shower door 608. For example, the first wing 1320 may extend outward from the center guide 1302 such that the first wing 1320 is in contact with the first shower door 608. For example, the first wing 1320 may be coupled to a spring (not shown) inside of the removable center guide 1302 that applies pressure to the first shower door 608. The pressure exerted onto the first door 608 from the first wing 1320 may prevent movement (e.g., rattling, shaking, etc.) of the center guide 1302 when the center guide 1302 is secured in place on the mount 1304 and the first shower door 608 is moving along the guide rail 602.

As shown in FIG. 14, the removable center guide 1302 defines a latch opening 1402. The latch opening 1402 is positioned near the bottom end 1305 of the removable center guide 1302 and below a center plate (not shown) of the removable center guide 1302. The latch opening 1402 extends from the first end 1306 to the second end 1308 of the removable center guide 1302.

The removable center guide 1302 also includes a latch 1404. The latch 1404 is positioned on the bottom end 1305 of the removable center guide 1302 and is positioned within the latch opening 1402 of the removable center guide 1302. The latch 1404 is coupled to a center plate (not shown) within the removable center guide 1302. For example, the user may press the first button 1318*a* and the second button 1318*b* to move center plate thus also moving the latch 1404. The latch 1404 is configured to move along a horizontal plane within the latch opening 1402. For example, the latch 1404 can move along a horizontal plane perpendicular to the guide rail 602. The latch 1404 is further configured to selectively secure the removable center guide 1302 to the mount 1304.

The removable center guide system 100 further includes at least one guide arm 1406. For example, the removable center guide 1302 may include a first guide arm 1406 and a second guide arm (not shown). The second guide arm may be positioned opposite of the first guide arm 1406. The first guide arm 1406 is positioned on a bottom side 1407 of the bottom end 1305 of the removable center guide 1302 and adjacent to the at least one button 1318*a*, 1318*b*. The first guide arm 1406 and the second guide arm are positioned below the latch 1404 to help guide the mount 1304 into the latch opening 1402 on the bottom end 1305 of the removable center guide 1302.

The mount 1304 includes a guide arm slot 1408. The guide arm slot 1408 is positioned on a side of the mount 104 opposite of the hook 114. The guide arm slot 1408 is configured to receive the at least one guide arm 1406. The at least one guide arm 1406 is configured to move along a horizontal plane parallel to the guide rail 602. The at least one guide arm 1406 guides (e.g., aids, aligns, etc.) the coupling of the removable center guide 1302 to the mount 1304.

According to at least the embodiment of FIGS. 14 and 15, the mount 104 further includes a recess (e.g., a slot, opening, etc.) 1410. The recess 1410 is positioned on a top surface of the mount 104. The recess 1410 receives the latch 1404 of the removable center guide 1302. For example, the removable center guide 1302 is slid onto the mount 104 parallel to the guide rail 602. When the latch 1404 slides over the recess 1410, the latch 1404 moves downward into the recess 1410 securing the removable center guide 1302 to the mount 104. To remove, or uncouple, the removable center guide 1302 from the mount 104, the user can push the at least one button 1318*a*, 1318*b* inwards towards the center of the removable center guide 1302. For example, the user may press both the first button 1318*a* and the second button 1318*b* towards the center of the removable center guide 1302. When the first button 1318*a* and the second button 1318*b* are pressed, the center plate (not shown) is moved horizontally outward toward the guide rail 602 lifting and moving the latch 1404 of the removable center guide 1302 horizontally out of the recess 1410. Furthermore, when the first button 1318*a* and the second button 1318*b* are pressed inward, the center plate releases the first wing 1320 from applying pressure onto the shower door 806 further allowing the removable center guide 1302 to be slid off of and uncoupled from the mount 104.

Figure 16:
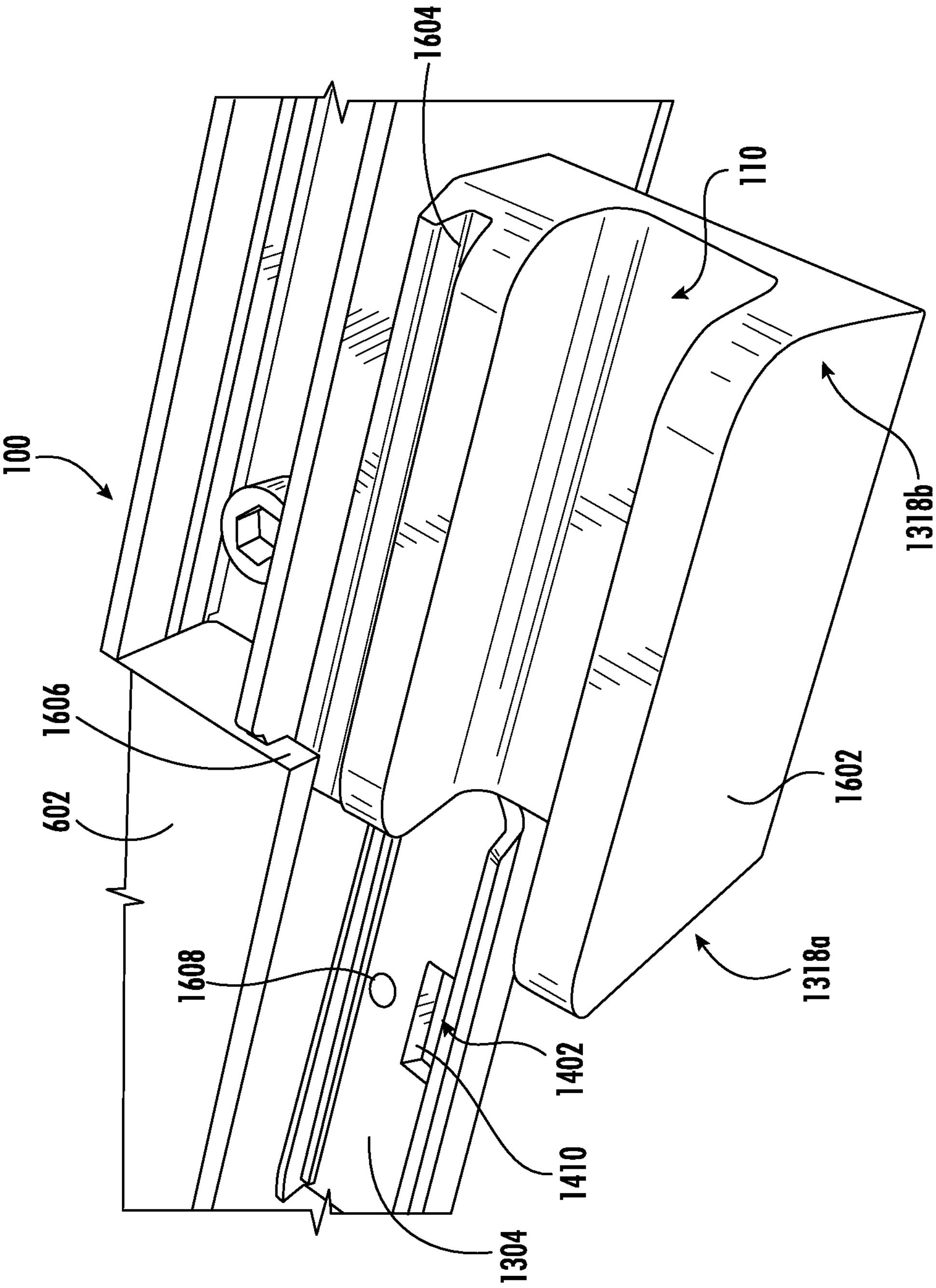
FIG. 16 is a top perspective view of the removable center guide system according to another embodiment.
Figure 17:
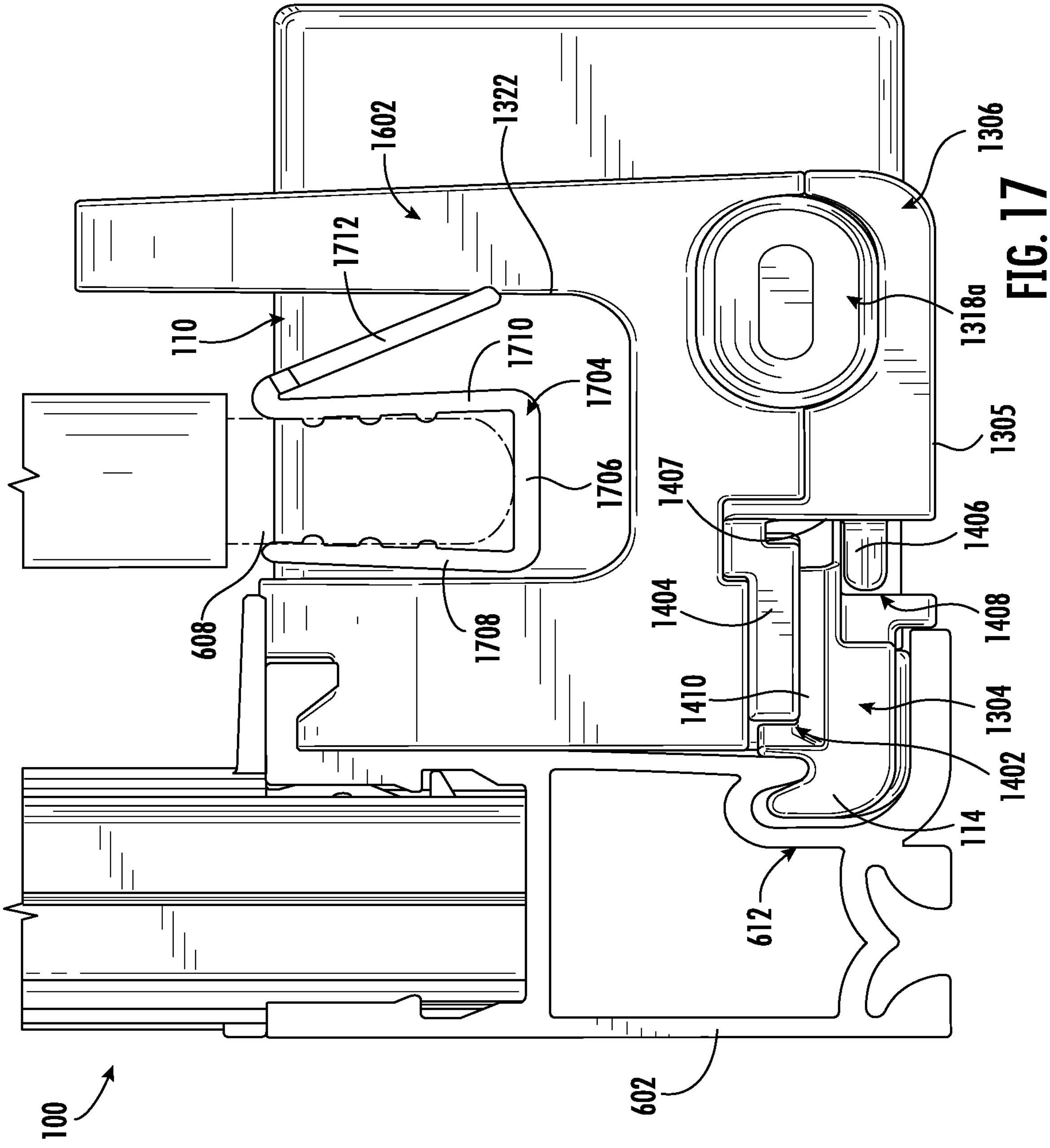
FIG. 17 is a side view of the removable center guide system according to the exemplary embodiment of FIG. 16.
Figure 18:
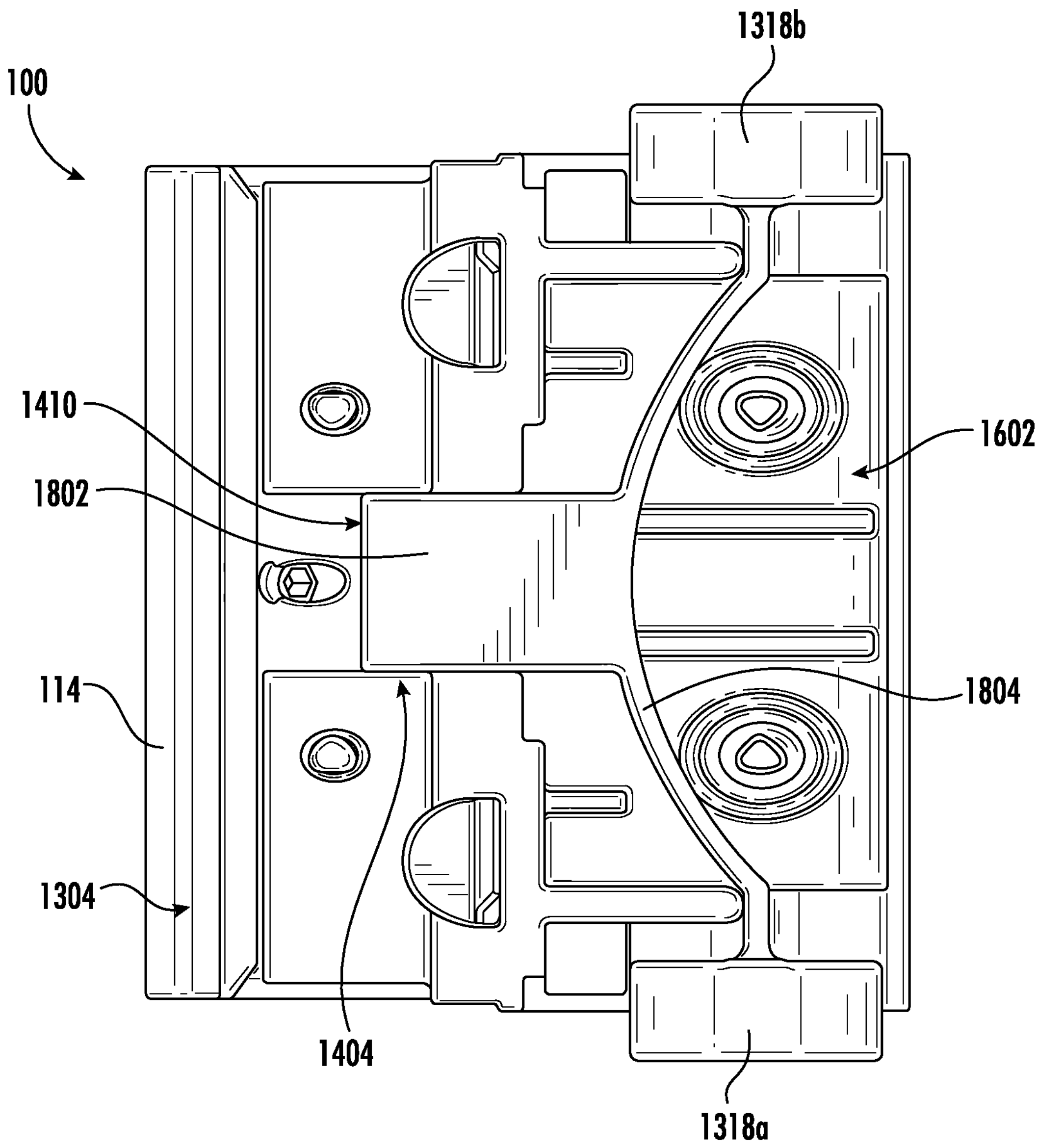
FIG. 18 is an interior view of the removable center guide system according to the exemplary embodiment of FIG. 16.

FIG. 16-18 illustrate the removable center guide system 100 according to another embodiment. FIG. 16 is a top perspective view of the removable center guide system according to another embodiment. FIG. 17 is a side view of the removable center guide system according to the exemplary embodiment of FIG. 16. FIG. 18 is an interior view of the removable center guide system according to the exemplary embodiment of FIG. 16.

According to this embodiment, the center guide 1602 does not include a wing positioned in the first aperture 110. The removable center guide system 100 instead includes the center guide 1602, the mount 1304, and a seal 1704. The seal 1704 is positioned on a bottom end of the first shower door 608. The seal 1704 is configured to prevent rattling or shaking (e.g., any unwanted movement) of the first shower door 608 within the first aperture 110.

As shown in FIG. 16, the center guide 1602 includes a guide recess 1604. The guide recess 1604 is positioned on a top surface of the center guide 1602 adjacent to the first aperture 110. The guide recess 1604 is configured to receive a portion of the shower guide rail 602. For example, the shower guide rail 1602 may include a rail hook 1606. In this embodiment, the guide recess 1604 receives the rail hook 1606 further coupling the center guide 1602 to the center guide system 100.

The mount 1304 of the center guide system 100 may include an aperture 1608. The aperture is configured to receive the screw 202 to secure the mount 1304 to the shower rail 602. According to this embodiment, the aperture 1608 is positioned on a bottom surface of the mount 1304. For example, the aperture 1608 is positioned on a surface of the mount where the latch opening 1402 is positioned.

The seal 1704 may be substantially U-shaped. For example, the seal 1704 can include a seal first portion 1706, a seal second portion 1708, and a seal third portion 1710. The seal first portion 1706 may be positioned on a bottom end of the first shower door 608. The seal second portion 1708 can extend from the seal first portion 1706 along a side of the first shower door 608. The seal third portion 1710 can extend off another end of the seal first portion 1706 along another side of the first shower door 608.

The seal 1704 can further include a seal wing 1712. The seal wing 1712 may extend from the seal third portion 1710 at an angle towards the first aperture wall 1322. The seal wing 1712 prevents horizontal movement of the first shower door 608 within the first aperture 110.

As shown in FIG. 18, the center guide 1602 includes a center plate 1802 and a curved connector 1804. The center plate 1802 is coupled to the curved connector 1804. The curved connector 1804 is coupled to each of the first button 1318*a* and the second button 1318*b*. The curved connector 1804 can bend (e.g., flex, is flexible) to move the center plate 1802. For example, the center plate 1802 is configured to move along a horizontal plane within the center guide 1602. The user can press the first button 1318*a* and the second button 1318*b* inwards which bends the curved connector 1804, thus moving the center plate 1802 along a horizontal plane towards the mount 1304. As the center plate 1802 moves toward the guide rail 602, the latch 1404 is released (e.g., disengaged) from the recess 1410, releasing the center guide 1602 from the mount 1304.

Figure 19:
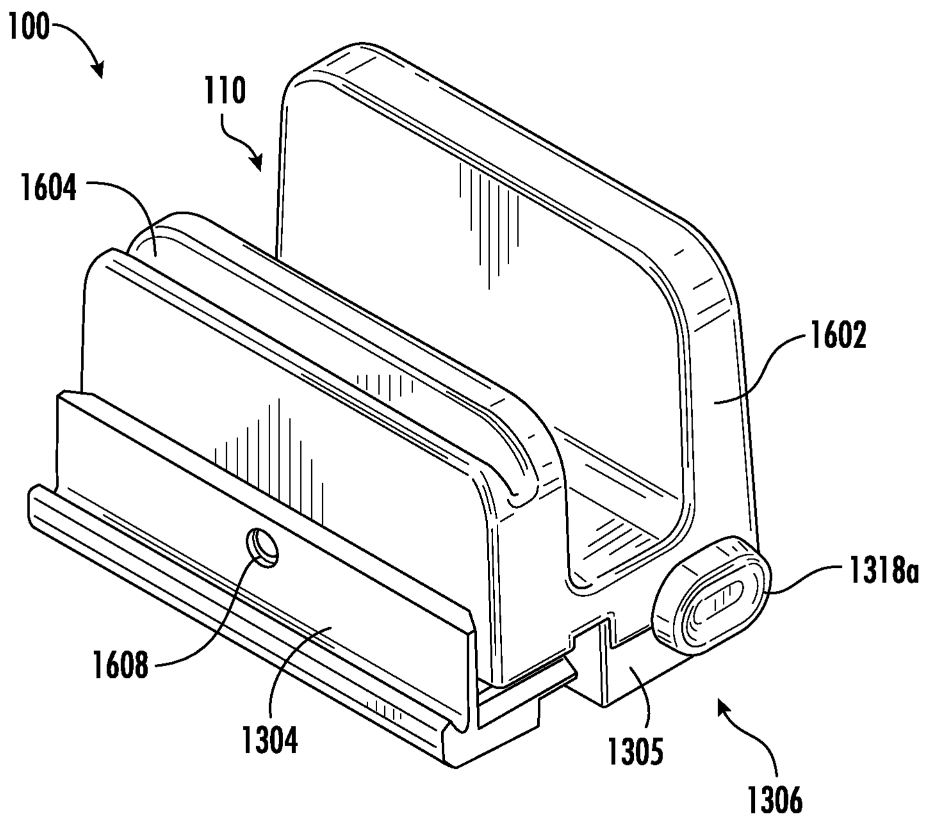
FIG. 19 is a perspective view of the removable center guide system according to another embodiment.
Figure 20:
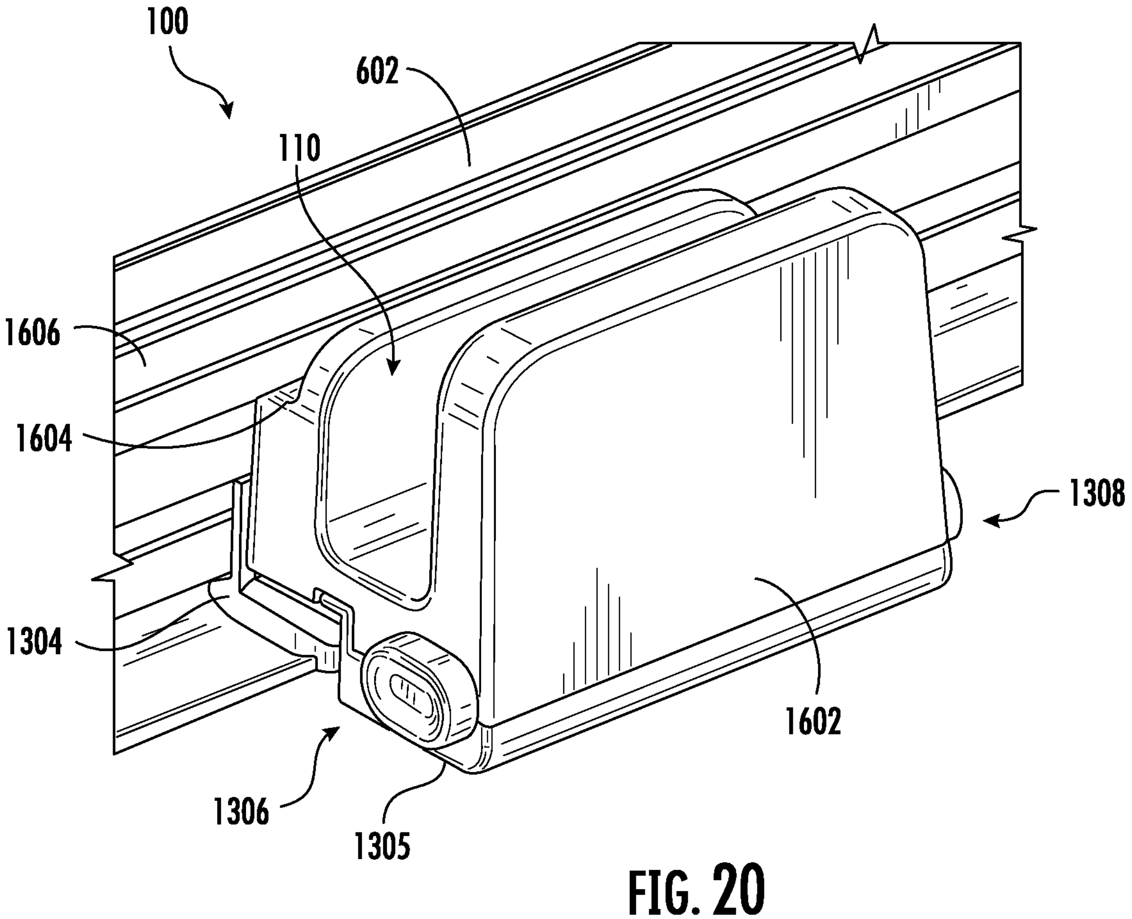
FIG. 20 is another perspective view of the removable center guide system according to the exemplary embodiment of FIG. 19.
Figure 21:
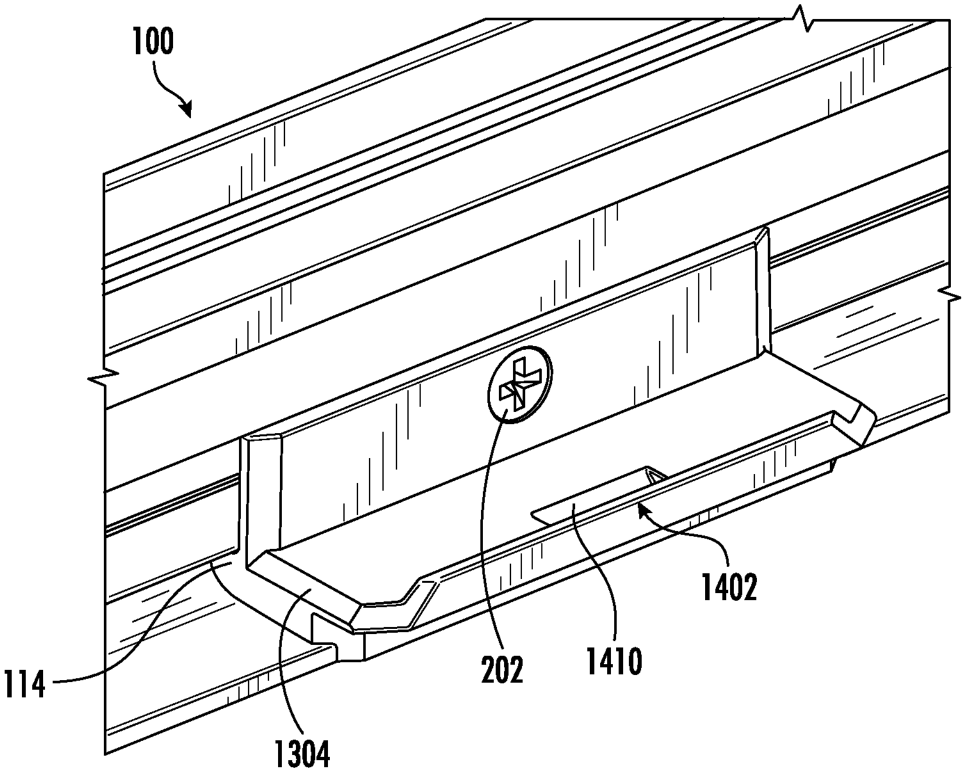
FIG. 21 is a perspective view of a mount for the removable center guide system according to the exemplary embodiment of FIG. 19.
Figure 22:
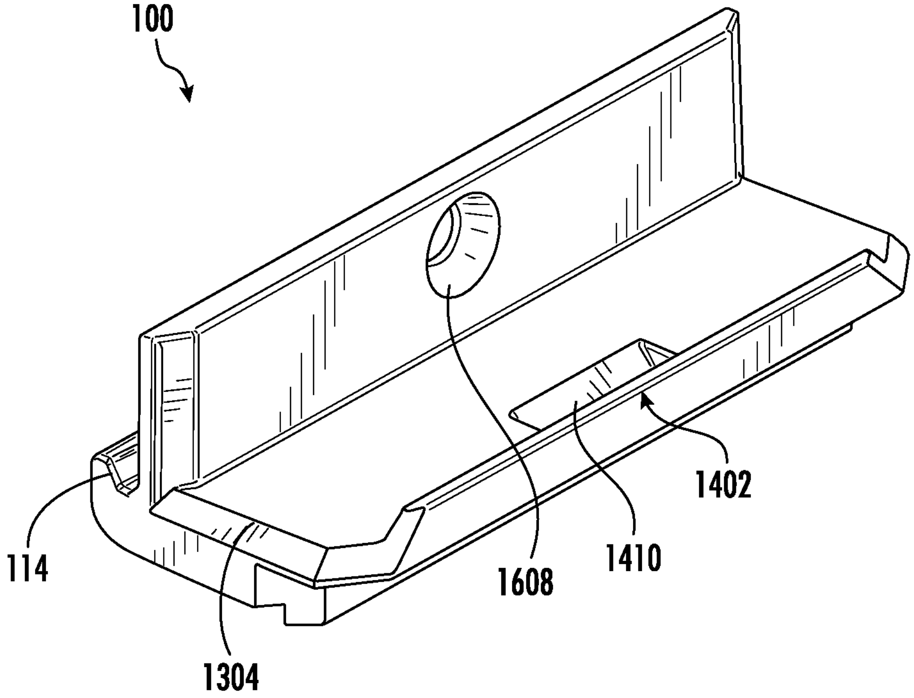
FIG. 22 is another perspective view of a mount for the removable center guide system according to the exemplary embodiment of FIG. 19.
Figure 23:
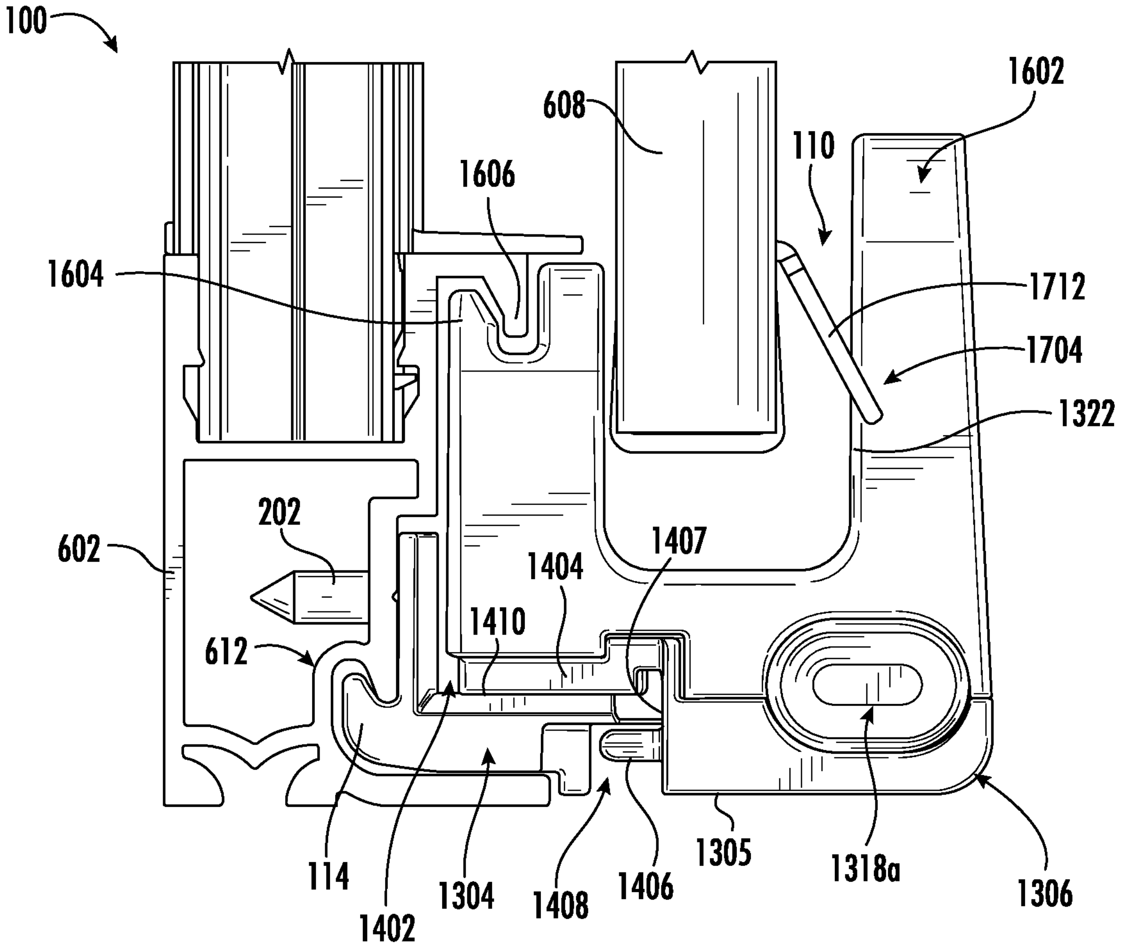
FIG. 23 is a side view of the removable center guide system according to the exemplary embodiment of FIG. 19.

FIGS. 19-23 illustrate the removable center guide system 100 according to another embodiment. FIG. 19 is a perspective view of the center guide system 100 including the center guide. FIG. 20 is another perspective view of the removable center guide system according to the exemplary embodiment of FIG. 19. FIG. 21 is a perspective view of a mount for the removable center guide system according to the exemplary embodiment of FIG. 19. FIG. 22 is another perspective view of a mount for the removable center guide system according to the exemplary embodiment of FIG. 19. FIG. 23 is a side view of the removable center guide system according to the exemplary embodiment of FIG. 19.

As shown in FIGS. 19-23, the center guide system 100 is similar to the embodiment of FIGS. 16-18. The mount 1304 of the center guide system 100 includes the aperture 1608. The aperture is configured to receive the screw 202 to secure the mount 1304 to the shower rail 602. According to this embodiment, the aperture 1608 is positioned on a side surface of the mount 1304. For example, the aperture 1608 is positioned on a surface of the mount perpendicular to the surface (e.g., the bottom surface, etc.) where the latch opening 1402 is positioned.

As shown in FIG. 23, the center guide system 100 also includes the seal 1704. However, in this embodiment, the seal 1704 only includes a portion of the seal 1704. For example, in this embodiment, the seal 1704 includes just the seal wing 1712. In other embodiments, the seal 1704 may only include one of the seal first portion 1706, the seal second portion 1708, the seal third portion 1710, or the seal wing 1712.

Figure 24:
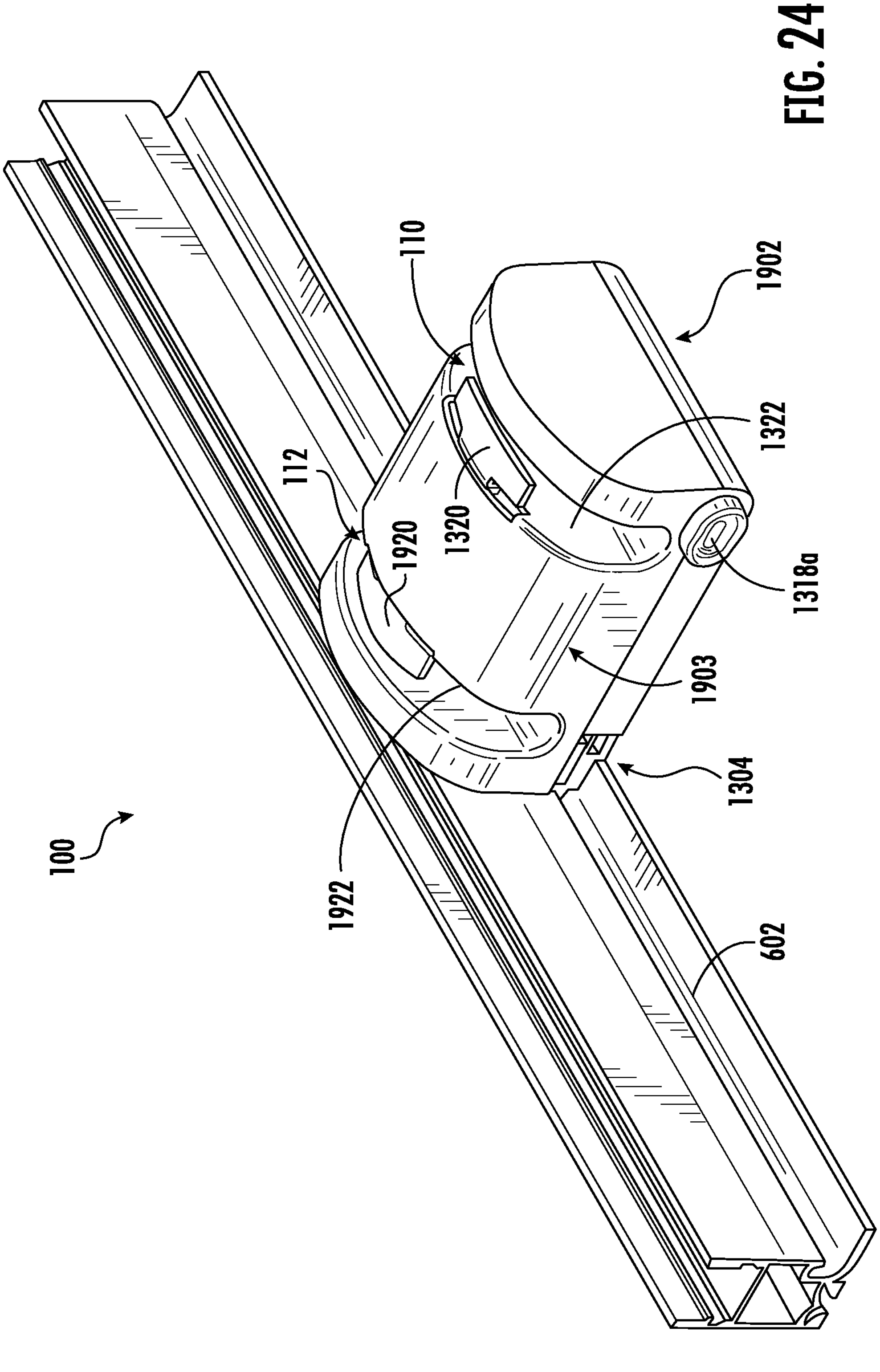
FIG. 24 is a perspective view of a removable center guide system according to another embodiment.
Figure 25:
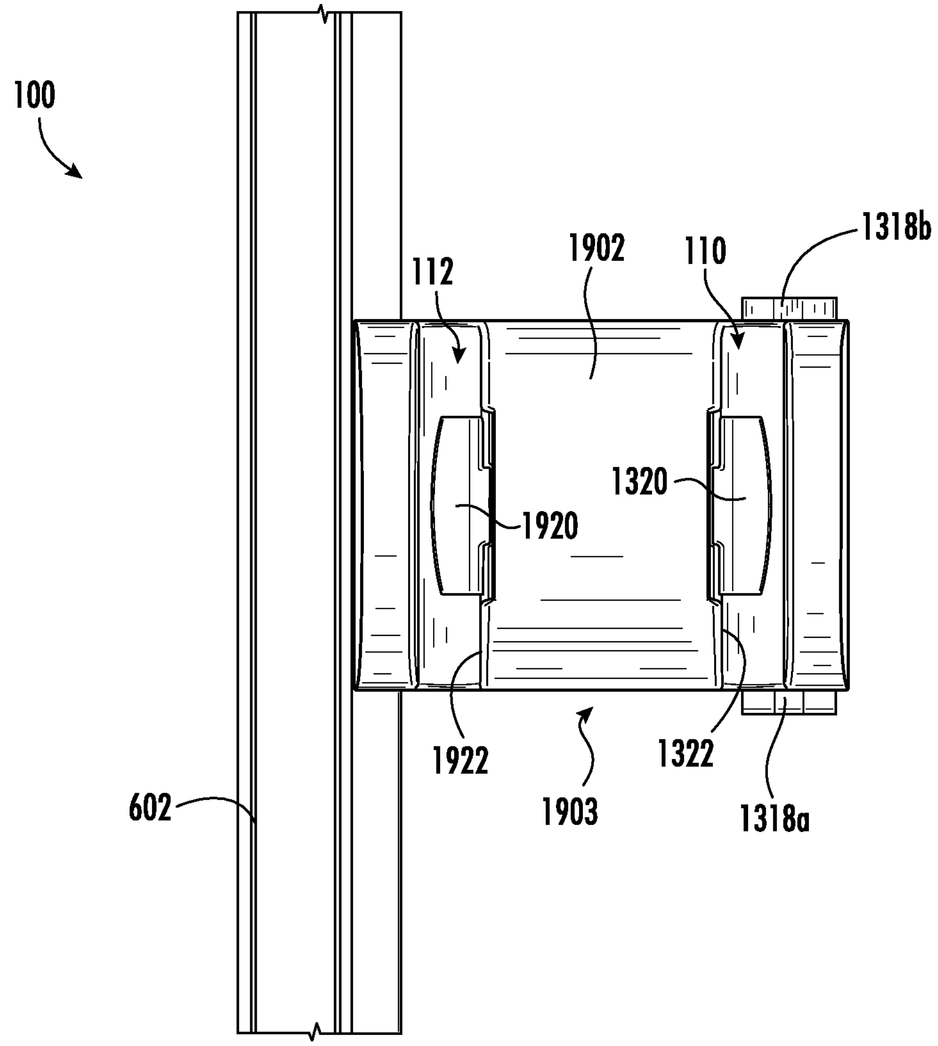
FIG. 25 is a top down view of a removable center guide system according to the exemplary embodiment of FIG. 24.
Figure 26:
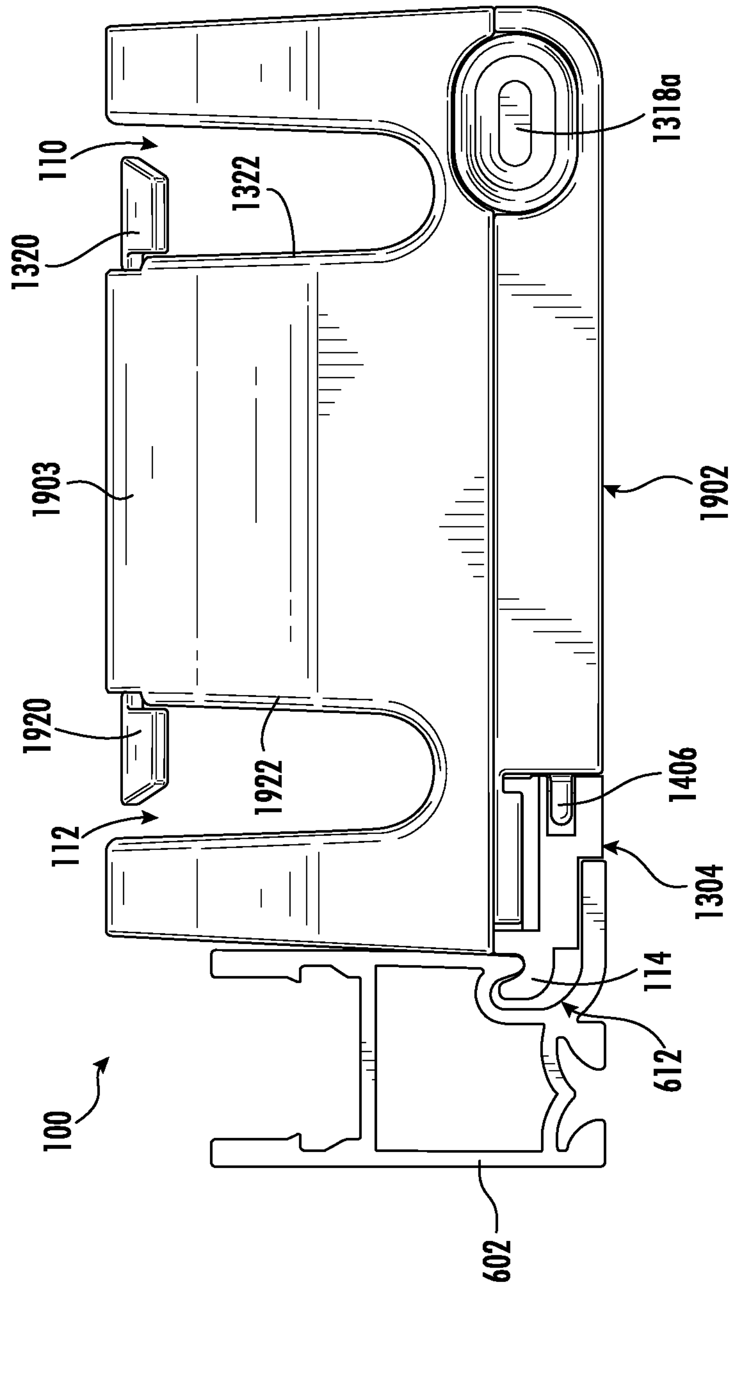
FIG. 26 is a side view of the removable center guide system according to the exemplary embodiment of FIG. 24.

FIGS. 24-28 illustrate the removable center guide system 100 according to another embodiment. FIG. 24 is a perspective view of the removable center guide system 100. FIG. 25 is a top down view of the removable center guide system 100. FIG. 26 is a side view of the removable center guide system 100. As shown in FIGS. 24-26, the removable center guide system 100 includes a center guide 1902, and a mount 1304.

According to this embodiment, the center guide 1902 is elongated and includes a first aperture 110 and a second aperture 112. The first aperture 110 and the second aperture 112 are configured to receive a first door and a second door respectively. For example, the center guide 102 according to this embodiment may be used with a slider shower door system (e.g., a slider door and a fixed panel system), or a slider shower door system including a first sliding door and a second sliding door.

The center guide 1902 includes the first wing 1320, a second wing 1920, and a second aperture wall 1922. The second aperture wall 1922 is positioned adjacent to the first aperture wall 1322. The second aperture wall 1922 defines the second aperture 112. Further, the second wing 1920 extends outward from the second aperture wall 1922. For example, the second wing 1920 may extend outward from the second aperture wall 1922 into the second aperture 112. The second wing 1920 may extend outward at an angle substantially perpendicular to the second aperture wall 1922.

The second wing 1920 prevents the second shower door (not shown) from moving within the second aperture 112. The second wing 1920 is configured to transfer load between the first shower door and the second shower door to prevent the rattling of both the first shower door and the second shower door within the first aperture 110 and the second aperture 112 respectively. For example, the first wing 1320 and the second wing 1920 may extend outward from the middle portion 1903 of the center guide 1902 such that the first wing 1320 is in contact with the first shower door and the second wing 1920 is in contact with the second shower door. For example, the first wing 1320 and the second wing 1920 may be coupled to a spring (not shown) inside of the removable center guide. Collectively, the first wing 1320, the second wing 1920, and the spring may be part of an anti-rattle spring complex positioned within the center guide 1902.

The pressure exerted onto the first shower door from the first wing 1320 and the pressure exerted onto the second shower door from the second wing 1920 may prevent movement (e.g., rattling, shaking, etc.) of the center guide 1902 when the center guide 1902 is secured in place on the mount 1304 and one of the first shower door or the second shower door is moving along the guide rail 602

Figure 27:
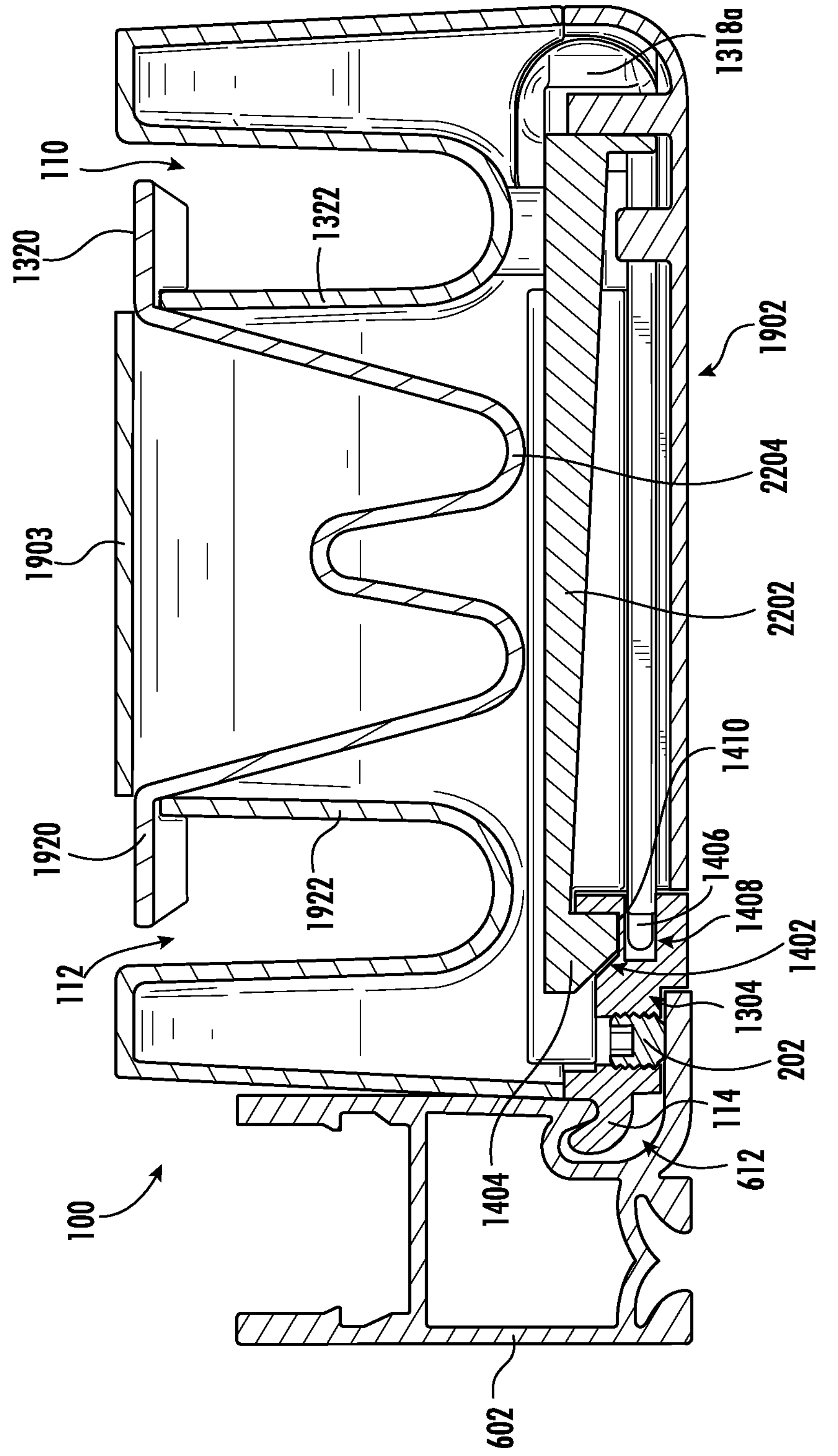
FIG. 27 is a cross-sectional view of the removable center guide system according to the embodiment of FIG. 24.
Figure 28:
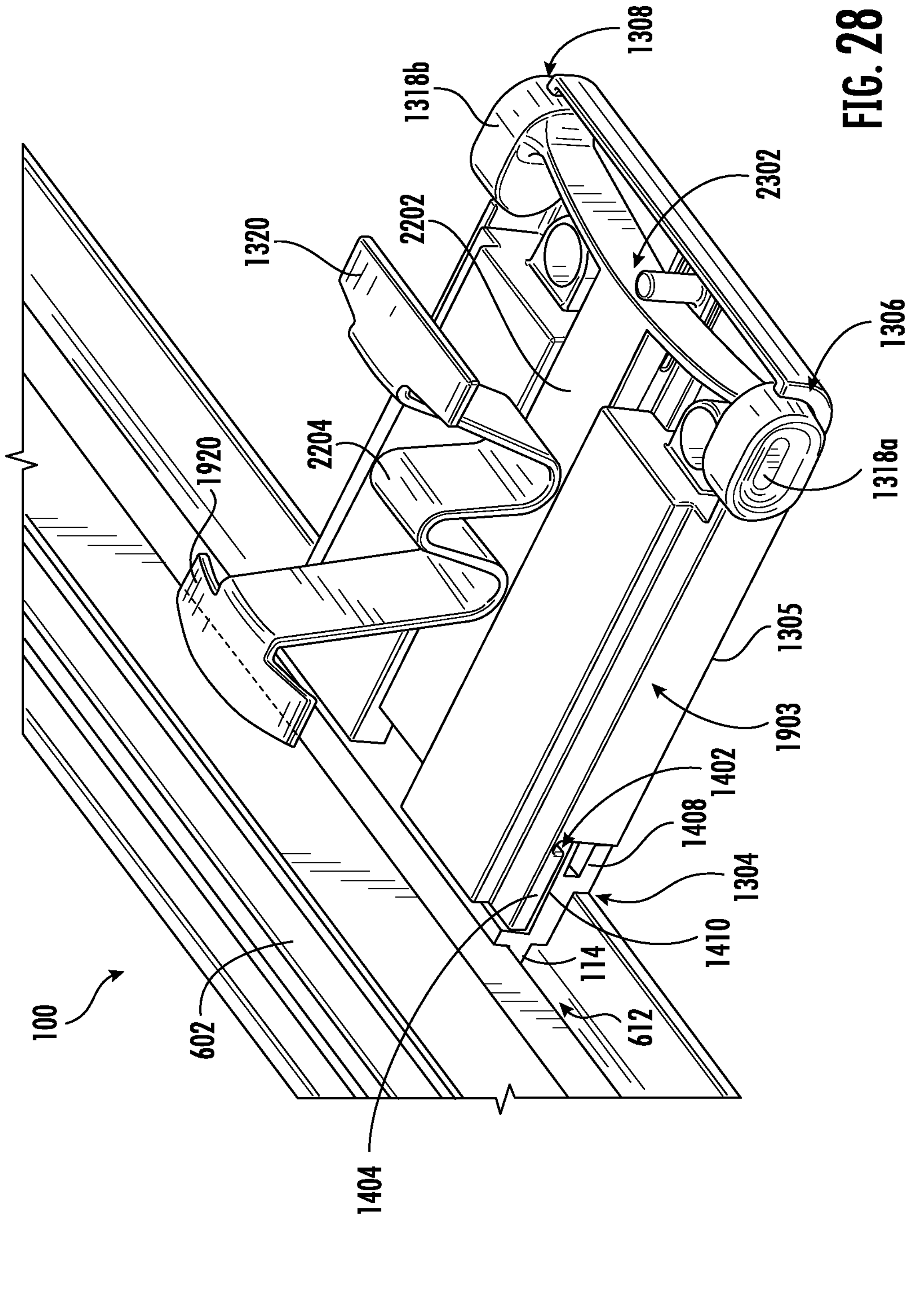
FIG. 28 is an interior view of the removable center guide system according to the embodiment of FIG. 24.

Now referring to FIGS. 27-28, FIG. 27 is a cross-sectional view of the removable center guide system 100 and FIG. 28 is an interior view of the removable center guide system 100 according to the embodiment of FIG. 24. As shown in FIG. 27, the removable center guide 1902 further includes a center plate 2202. The center plate 2202 is positioned within the removable center guide 1902. The center plate 2202 is coupled to the first button 1318*a* and the second button 1318*b*. The latch 1404 is positioned on an end of the center plate 2202 opposite the end adjacent to the first button 1318*a* and the second button 1318*b*. The center plate 2202 can move (e.g., slide) perpendicular to the guide rail 602. The center plate 2202 is configured to move the latch 1404 out of the recess 1410 to release (e.g., uncouple, remove, etc.) the removable center guide 1902 from the mount 1304.

When the user presses the first button 1318*a* and the second button 1318*b* inwards towards one another, the center plate 2202 moves along a horizontal plane towards the guide rail 602, moving the latch 1404 out of the recess 1410 to allow the removable center guide to slide off of the mount 1304. For example, when the center plate 2202 moves along the horizontal plane towards the guide rail 602, the latch 1404 is disengaged from the recess 1410, thus releasing the center guide 1902 from the mount 1304.

The removable center guide further includes a spring 2204. According to this embodiment, the spring 2204 has a "w" shape. The spring 2204 is coupled to the first wing 1320 and the second wing 1920. The spring 2204 and expand and contract to selectively apply pressure to at least one of a first shower door and a second shower door (not shown). When the removable center guide 1902 is secured onto the mount 1304, the spring is expanded and applying pressure to at least one of the first shower door and the second shower door via the first wing 1320 and the second wing 1920 respectively.

As shown in FIG. 28, the removable center guide further includes a curved connector 2302. The curved connector 2302 is coupled to each of the first button 1318*a*, the second button 1318*b*, and the center plate 2202. The curved connector 2302 is configured to bend and retract back to a resting state. For example, when the first button 1318*a* and the second button 1318*b* are pressed inward, the curved connector 2302 bends to a greater radius of curvature pushing the center plate 2202 towards the guide rail 602. When the user releases pressure from both the first button 1318*a* and the second button 1318*b*, the curved connector 2302 retracts back to its resting shape, moving the center plate 2202 away from the guide rail 602.

The terms "coupled," "connected," and the like, as used herein, mean the joining of two members directly or indirectly to one another. Such joining may be stationary (e.g., permanent) or moveable (e.g., removable or releasable). Such joining may be achieved with the two members, or the two members and any additional intermediate members being integrally formed as a single unitary body with one another or with the two members or the two members and any additional intermediate members being attached to one another.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the debris-reducing drain insert as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Other substitutions, modifications, changes and omissions may also be made in the design, operating conditions and arrangement of the various exemplary embodiments without departing from the scope of the present invention. For example, any element (e.g., cutting blade, cutting plate, cover, impeller, support structure etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A removeable center guide system, comprising:

a center guide comprising:

a center guide body including a first channel along a length of the center guide, the first channel configured to receive a shower door, a center plate positioned within the center guide body, the center plate configured to slidably move in a direction perpendicular to the length of the center guide from a first position to a second position, and a latch coupled to the center plate; and a mount comprising a recess and removably coupled with the center guide, the latch of the center guide releasably positioned within the recess and the center plate positioned in the first position when the center guide is coupled to the mount, wherein the latch is disengaged from the recess and the center plate is in the second position when the center guide is released from the mount and moves in a direction parallel to a length of the mount.

2. The system of claim 1, wherein the center guide further comprises:

a first button positioned on a first end of the center guide body; and a second button positioned on a second end of the center guide body opposite the first end;

wherein the first button and the second button are coupled to the center plate and configured to, when engaged, slidably move the center plate.

3. The system of claim 2, wherein when the first button and the second button are engaged, the latch is released from the recess.

4. The system of claim 2, wherein the center guide further comprises a curved connector coupled to each of the first button, the second button, and the center plate, the curved connector configured to bend, when engaged by the first button and the second button, to move the center plate within the center guide body.

5. The system of claim 1, wherein the mount further comprises a hook positionable within a shower rail, the hook configured to couple the mount to the shower rail.

6. The system of claim 1, wherein the center guide further comprises a guide arm extending outward from the center guide body parallel to the latch, the guide arm configured to guide the center guide body onto the mount.

7. The system of claim 6, wherein the mount further comprises:

an aperture configured to receive a screw to couple the mount to a shower rail; and a slot positioned below the recess, the slot configured to receive the guide arm to align the latch with the recess.

8. The system of claim 1, wherein the center guide body includes a second channel parallel to the first channel, the second channel configured to receive a second shower door.

9. The system of claim 1, wherein the center guide body includes a guide recess, the guide recess configured to engage with a shower rail to couple the center guide to the shower rail.

10. A removable center guide system, comprising:

a center guide comprising:

a center guide body including a first channel along a length of the center guide, the first channel configured to receive a first shower door, and a center plate positioned within the center guide body, the center plate configured to slidably move in a direction perpendicular to the length of the center guide;

a mount removably coupled to the center guide, the center guide movable in a direction parallel to a length of the mount when released from the mount, the center guide being released from the mount when the center plate is moved in the direction perpendicular to the length of the center guide; and a seal positioned within the first channel, the seal configured to engage with the first shower door to restrict lateral movement of the shower door within the first channel.

11. The system of claim 10, wherein the seal comprises:

a first portion in contact with at least the first shower door;

a second portion extending from a first end of the first portion; and a third portion extending from a second end of the first portion opposite the first end;

wherein each of the first portion, the second portion, and the third portion, surround a portion of the first shower door.

12. The system of claim 11, wherein the seal further comprises a seal wing extending at an angle from the third portion, the seal wing configured to engage with a wall of the first channel to restrict lateral movement of the first shower door within the first channel.

13. The system of claim 10, wherein the center guide further comprises a latch coupled to an end of the center plate, and wherein the mount further comprises a recess configured to receive the latch to couple the center guide to the mount.

14. The system of claim 13, wherein the center guide further comprises:

a first button positioned on a first end of the center guide body;

a second button positioned on a second end of the center guide body opposite the first end; and a curved connector coupled to each of the first button, the second button, and the center plate, the curved connector configured to bend, when engaged by the first button and the second button, to move the center plate within the center guide body;

wherein the first button and the second button are configured to, when engaged, bend the curved connector to slidably move the center plate to disengage the latch from the recess.

15. A removeable center guide system, comprising:

a center guide comprising:

a center guide body including a first channel along a length of the center guide, the first channel configured to receive a shower door, a center plate positioned within the center guide body, the center plate configured to slidably move in a direction perpendicular to the length of the center guide, a latch coupled to the center plate, and a guide arm extending outward from the center guide body parallel to the latch, the guide arm configured to guide the center guide body onto a mount; and the mount comprising:

a recess and removably coupled with the center guide, the recess of the mount in communication with the latch of the center guide, wherein the latch is released from the recess when the center guide moves in a direction parallel to a length of the mount, an aperture configured to receive a screw to couple the mount to a shower rail, and a slot positioned below the recess, the slot configured to receive the guide arm to align the latch with the recess.

16. The system of claim 15, wherein the center guide body includes a second channel parallel to the first channel, the second channel configured to receive a second shower door.

17. The system of claim 15, wherein the center guide body includes a guide recess, the guide recess configured to engage with a shower rail to couple the center guide to the shower rail.

18. The system of claim 15, wherein the center guide further comprises:

a first button positioned on a first end of the center guide body; and a second button positioned on a second end of the center guide body opposite the first end;

wherein the first button and the second button are coupled to the center plate and configured to, when engaged, slidably move the center plate.

19. The system of claim 18, wherein when the first button and the second button are engaged, the latch is released from the recess.

20. The system of claim 15, wherein the mount further comprises a hook positionable within a shower rail, the hook configured to couple the mount to the shower rail.

* * * * *